(12) United States Patent
Sakai et al.

(10) Patent No.: US 10,012,866 B2
(45) Date of Patent: Jul. 3, 2018

(54) MIRROR DISPLAY AND ELECTRONIC DEVICE

(71) Applicant: Sharp Kabushiki Kaisha, Sakai, Osaka (JP)

(72) Inventors: Akira Sakai, Sakai (JP); Masahiro Hasegawa, Sakai (JP); Hiroyuki Hakoi, Sakai (JP); Kiyoshi Minoura, Sakai (JP); Shigeaki Mizushima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/125,975

(22) PCT Filed: Feb. 17, 2015

(86) PCT No.: PCT/JP2015/054224
§ 371 (c)(1),
(2) Date: Sep. 14, 2016

(87) PCT Pub. No.: WO2015/141350
PCT Pub. Date: Sep. 24, 2015

(65) Prior Publication Data
US 2017/0082895 A1 Mar. 23, 2017

(30) Foreign Application Priority Data
Mar. 19, 2014 (JP) ................ 2014-056570

(51) Int. Cl.
*G02F 1/1335* (2006.01)
*G02B 5/30* (2006.01)
*G02F 1/1334* (2006.01)

(52) U.S. Cl.
CPC ......... *G02F 1/133555* (2013.01); *G02B 5/30* (2013.01); *G02B 5/3041* (2013.01);
(Continued)

(58) Field of Classification Search
None
See application file for complete search history.

(56) References Cited

U.S. PATENT DOCUMENTS 6,512,559 B1 * 1/2003 Hashimoto ......... G02F 1/13475
349/74
2004/0051827 A1 3/2004 Hinata et al.
(Continued)

FOREIGN PATENT DOCUMENTS

JP 11-015392 A 1/1999
JP 2003-241175 A 8/2003
(Continued)

OTHER PUBLICATIONS

Official Communication issued in International Patent Application No. PCT1JP20151054224, dated May 19, 2015.

*Primary Examiner* — Dennis Y Kim
(74) *Attorney, Agent, or Firm* — Keating & Bennett, LLP

(57) ABSTRACT

The present invention provides a mirror display that can match the peripheral environment having diffusely reflecting surfaces in the mirror mode, and an electronic device including the mirror display. The mirror display includes a half mirror plate that includes a reflective polarizer and a display device. The half mirror plate further includes a light-diffusing member that diffuses at least part of incident light. The mirror display includes, in the order from the back surface side, the display device, the reflective polarizer, and the light-diffusing member.

9 Claims, 15 Drawing Sheets

(52) U.S. Cl.
CPC ...... *G02F 1/1334* (2013.01); *G02F 1/133504* (2013.01); *G02F 1/133536* (2013.01); *G02F 2001/133538* (2013.01); *G02F 2001/133557* (2013.01); *G02F 2203/02* (2013.01)

(56) References Cited

U.S. PATENT DOCUMENTS

| | | | |
|---|---|---|---|
| 2004/0100598 A1* | 5/2004 | Adachi | G02F 1/133536 349/113 |
| 2006/0159958 A1 | 7/2006 | Lee | |
| 2008/0252832 A1* | 10/2008 | Nieuwkerk | G02F 1/133504 349/112 |
| 2008/0309852 A1* | 12/2008 | O'Donnell | G02F 1/133536 349/74 |
| 2011/0051053 A1* | 3/2011 | Okamura | G02B 3/0056 349/96 |
| 2012/0262646 A1* | 10/2012 | Iwata | G02B 5/0236 349/64 |
| 2015/0177563 A1* | 6/2015 | Cho | G02F 1/133536 349/96 |

FOREIGN PATENT DOCUMENTS

| | | |
|---|---|---|
| JP | 2004-085590 A | 3/2004 |
| JP | 2004-125885 A | 4/2004 |
| JP | 2004-125886 A | 4/2004 |
| JP | 2005-195824 A | 7/2005 |
| JP | 2006-201782 A | 8/2006 |
| JP | 2009-008710 A | 1/2009 |
| JP | 2010-026454 A | 2/2010 |

\* cited by examiner

000
MIRROR DISPLAY AND ELECTRONIC DEVICE

TECHNICAL FIELD

The present invention relates to a mirror display and an electronic device. The present invention specifically relates to a mirror display that can be operated in both a mirror mode in which the display serves as a mirror and a display mode in which the display shows an image, and an electronic device including the mirror display.

BACKGROUND ART

FIG. 23 includes explanatory views showing the display states in the power-on state and in the power-off state of a common conventional display device. As shown in FIG. 23, a display device 21 in the power-on state shows an image in a display region A. A region (frame region B) called a frame or a bezel in the periphery of the display region A does not contribute to image display. In contrast, a display device 22 in the power-off state shows no image in the display region A, and the frame region B still does not contribute to image display.

Such a common conventional display device is proposed to achieve image display with a high luminance in a display state such as a power-on state when combined with, for example, a polarized-light-diffusing film (e.g. Patent Literature 1). In a non-display state such as a power-off state, such a conventional display device unfortunately shows only a black or gray screen so that the device is useless for users. Besides, a large-size, difficult-to-move display device (e.g. digital signage and television receivers) can be merely an obstruction for users because it occupies the same space either in the non-display state or in the display state. Especially, a black screen that is shown by a conventional display device placed in a bright room fails to match the bright-color-based interior or wall (wall 23 in FIG. 23) or the housing of the display device and thus may cause uncomfortable feeling. In summary, common conventional display devices have their own value only when they are in the display state.

In order to solve these disadvantages, a mirror display is proposed which includes a half mirror plate including a half mirror layer on the viewing surface side of a display device so that it can serve as a mirror in the non-display state (e.g. Patent Literatures 2 to 5). Such a mirror display can serve not only as a display, which is the original purpose, but also as a mirror. Specifically, when display light is emitted from the display device, the mirror display shows an image owing to the display light in a region where the display light is emitted from the display device. When no display light is emitted from the display device, on the other hand, the mirror display reflects the outside light and serves as a mirror in a region where the display light is not emitted from the display device.

The half mirror layer is made of an optical member with a reflective function. Examples of the optical member include reflective polarizers such as multi-layer reflective polarizers and wire-grid reflective polarizers (e.g. Patent Literatures 6 and 7). A reflective polarizer reflects a polarized light component parallel to the reflection axis and transmits a polarized light component perpendicular to the reflection axis, among the incident light components. The reflective polarizer thus can transmit the light emitted from the display device to the viewing surface side as display light and can reflect outside light perpendicular to the polarization direction of the display light to the viewing surface side. A mirror display that includes a reflective polarizer as a half mirror layer utilizes such principles to switch the display mode and the mirror mode.

CITATION LIST

Patent Literature

Patent Literature 1: JP 2010-26454 A
Patent Literature 2: JP 2003-241175 A
Patent Literature 3: JP H11-15392 A
Patent Literature 4: JP 2004-085590 A
Patent Literature 5: JP 2004-125885 A
Patent Literature 6: JP 2006-201782 A
Patent Literature 7: JP 2005-195824 A

SUMMARY OF INVENTION

Technical Problem

Even such a mirror display unfortunately still causes uncomfortable feeling because the display fails to perfectly match the interior or the housing of the display device in a non-display state (mirror mode).

The inventors of the present invention studied the reasons for the uncomfortable feeling and found the following facts. That is, a half mirror plate (e.g. a reflective polarizer) has an almost perfect specular reflective surface and mostly provides regular reflection. In the mirror mode, the reflection of the lighting or objects placed in front of the half mirror plate is seen in the direction of regular reflection while black display is seen in directions other than the direction of regular reflection. In contrast, since an object usually has a diffusely reflecting surface and thus mostly provides diffuse reflection, the surface of the object looks totally different from a specular reflective surface. For example, when an observer sees the wall under white lighting, the wall looks white because he or she sees the state that the light emitted from the white lighting is diffusely reflected by the wall. In this case, the wall usually looks white even when the observation direction is more or less changed. As described above, the texture of the surface of the mirror display, i.e., the texture of the surface of the half mirror plate, is greatly different from the texture of the peripheral environment (objects) around the mirror display. The inventors attributed the uncomfortable feeling to this difference.

For example, Patent Literature 4 discloses use of a reflective polarizer as a half mirror layer. In the configuration disclosed in Patent Literature 4, the reflective polarizer disposed on the viewing surface side of the display device unfortunately has a specular reflective surface with strong regular reflection. The configuration is thus less likely to match the interior or the housing of the display device having diffusely reflecting surfaces. Still, there is room for improvement in this configuration.

The present invention was made in consideration of the above situation and aims to provide a mirror display that can match the peripheral environment having diffusely reflecting surfaces in the mirror mode and an electronic device including the mirror display.

Solution to Problem

The inventors conducted intensive studies about mirror displays that can match the peripheral environment having diffusely reflecting surfaces in the mirror mode and focused on a configuration including a diffusely reflecting surface. The inventors found disposing a light-diffusing member that diffuses at least part of incident light closer to the viewing surface side than the reflective polarizer as a half mirror layer. The inventors thereby solved the above problem and arrived at the present invention.

That is, an aspect of the present invention may be a mirror display including a half mirror plate that includes a reflective polarizer and a display device, the half mirror plate further including a light-diffusing member that diffuses at least part of incident light, the mirror display including, in the order from the back surface side, the display device, the reflective polarizer, and the light-diffusing member.

Another aspect of the present invention may be an electronic device including the above mirror display.

Advantageous Effects of Invention

The present invention provides a mirror display that can match the peripheral environment having diffusely reflecting surfaces in the mirror mode, and an electronic device including the mirror display.

DESCRIPTION OF EMBODIMENTS

Figure 1:
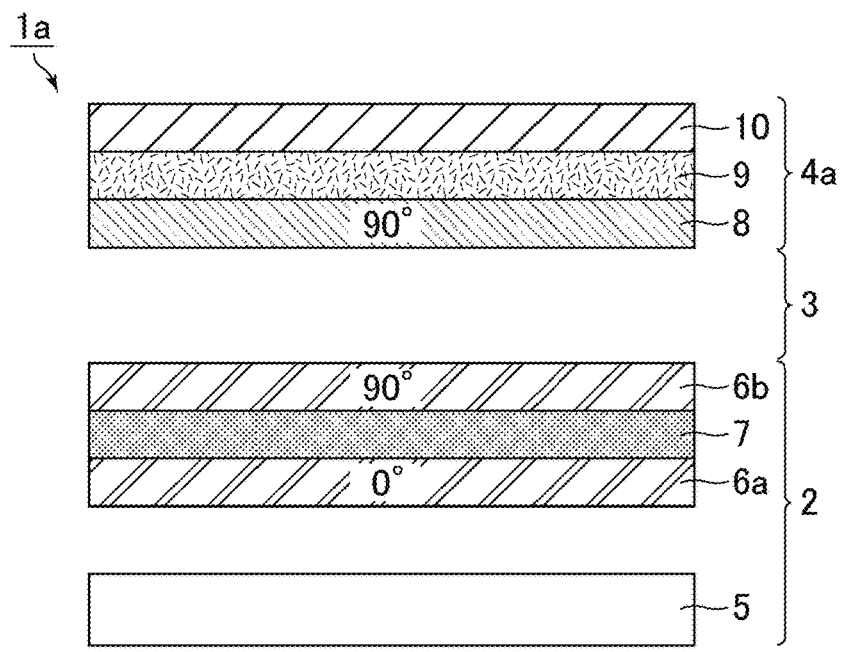
FIG. 1 is a schematic cross-sectional view showing a mirror display of Example 1.

The present invention will be described in detail below by way of, but not limited to, the following examples referring to the drawings. The structures of the respective examples may be employed in appropriate combination or may be modified as long as the combination or the modification is not beyond the spirit of the present invention.

Although the following examples describe the case where a liquid crystal display device is used as a display device, the kind of the display device is not particularly limited. Display devices such as a plasma display device, an organic electroluminescence display device, an inorganic electroluminescence display device, and a micro electro mechanical systems (MEMS) display may also be used.

A display mode herein means the state in which display light is emitted from the display device (display state) and the display light passes through the half mirror plate. A mirror mode herein means the state in which display light is not emitted from the display device (non-display state).

The haze (diffusivity) of each member was determined by measuring the diffuse transmittance and the total light transmittance of the member alone, i.e., in the state where the member is separated from the mirror display, based on the equation: haze (%)=(diffuse transmittance)/(total light transmittance)×100. The diffuse transmittance and the total light transmittance were measured with a haze meter (trade name: NDH-2000) available from Nippon Denshoku Industries Co., Ltd.

EXAMPLE 1

Example 1 relates to a mirror display that includes a liquid crystal display device, a reflective polarizer as a half mirror layer, and a light-diffusing layer as a light-diffusing member.

FIG. 1 is a schematic cross-sectional view showing a mirror display of Example 1. As shown in FIG. 1, a mirror display 1a includes, in the order from the back surface side toward the viewing surface side, a liquid crystal display device 2, an air layer 3, and a half mirror plate 4a. The liquid crystal display device 2 and the half mirror plate 4a were fixed by fitting the upper and lower edges of the half mirror plate 4a to a pair of aluminum rails which are attached to the upper and lower edges of the liquid crystal display device 2 so as to form a frame-like structure. The air layer 3 is the space formed in a slight gap between the liquid crystal display device 2 and the half mirror plate 4a. The angles shown in FIG. 1 each indicate the azimuth angle of the transmission axis of each member. The same shall apply to other figures. The term "viewing surface" herein refers to the surface of the mirror display on the half mirror plate side, and the term "viewing surface side" refers to the upper side of the mirror display 1a in FIG. 1. The term "back surface" refers to the surface opposite to the viewing surface of the mirror display, and the term "back surface side" refers to the lower side of the mirror display 1a in FIG. 1. The same shall apply to each example.

The liquid crystal display device 2 includes, in the order from the back surface side toward the viewing surface side, a backlight 5, an absorptive polarizer 6a, a liquid crystal display panel 7, and an absorptive polarizer 6b. The liquid crystal display device 2 used was a liquid crystal television (trade name: LC-20F5) available from Sharp Corp. The display mode of the liquid crystal display panel 7 was UV$^2$A. The liquid crystal display device 2 may appropriately include a component such as a bezel in the frame region. A suitable bezel is one made of a black plastic resin.

The absorptive polarizer 6a was bonded to the back surface side of the liquid crystal display panel 7 with an acrylic adhesive (not shown) in between. The absorptive polarizer 6b was bonded to the viewing surface side of the liquid crystal display panel 7 with an acrylic adhesive (not shown) in between. The transmission axis of the absorptive polarizer 6a was set to an azimuth angle of 0° and the transmission axis of the absorptive polarizer 6b was set to an azimuth angle of 90°, thereby the two transmission axes being arranged in crossed Nicols, provided that the degree of azimuth angle is defined to increase in positive (+) in the counterclockwise direction starting from the long side of the liquid crystal display device 2. The azimuth angles of the axes are described on the basis of the above definition hereinbelow. The absorptive polarizer 6b underwent no anti-reflection treatment but underwent an anti-glare (AG) treatment with a haze of 3.0% on the surface thereof.

The absorptive polarizer 6b disposed on the viewing surface side of the liquid crystal display device 2 may be eliminated and the function thereof may alternatively be achieved by a reflective polarizer 8 which serves as a half mirror layer disposed in the half mirror plate 4a. Still, reflective polarizers usually have a lower degree of polarization than absorptive polarizers. Thus, elimination of the absorptive polarizer 6b decreases the contrast of the mirror display in the display mode. In other words, if the reflective polarizer 8 has a sufficient degree of polarization, the absorptive polarizer 6b can be eliminated. In order to eliminate the absorptive polarizer 6b, the degree of polarization of the reflective polarizer 8 is preferably 90% or higher (the contrast ratio is 10 or higher), more preferably 99% or higher (the contrast ratio is 100 or higher).

The half mirror plate 4a includes, in the order from the back surface side toward the viewing surface side, the reflective polarizer 8 as a half mirror layer, a light-diffusing layer 9 as a light-diffusing member, and a glass substrate 10 as a base material supporting the half mirror layer. The respective members were bonded to one another with an acrylic adhesive (not shown) in between.

The thickness of the glass substrate 10 was 2.5 mm. The thickness of the glass substrate 10 is not limited to 2.5 mm as mentioned, and may be thinner or thicker than this value. The glass substrate 10 is suitably made of tempered glass. The glass substrate 10 may be replaced by a transparent plate made of acrylic resin, for example. From the view point of good flatness and good rigidity of the half mirror plate, a glass substrate is preferably used as a base material. From the view point that the half mirror plate 4a can sufficiently serve as a mirror, no antireflection film was disposed on the viewing surface side of the glass substrate 10.

For the reflective polarizer 8, a multi-layer reflective polarizer (trade name: DBEF) available from Sumitomo 3M Ltd. was used with the azimuth angle of the transmission axis thereof set to 90°. The reflective polarizer may be a wire-grid reflective polarizer. Examples of the wire-grid reflective polarizer include those disclosed in Patent Literatures 6 and 7. The transmission axis (azimuth angle: 0°) of the absorptive polarizer 6a and the transmission axis (azimuth angle: 90°) of the reflective polarizer 8 are substantially perpendicular to each other. The transmission axis (azimuth angle: 90°) of the absorptive polarizer 6b and the transmission axis (azimuth angle: 90°) of the reflective polarizer 8 are substantially parallel to each other. The expression that two azimuthal orientations are substantially perpendicular to each other herein means that the angle formed by the two azimuthal orientations is in the range of 90°±3°, preferably in the range of 90°±1°, more preferably in the range of 90°±0.5°. Similarly, the expression that two azimuthal orientations are substantially parallel to each other herein means that the angle formed by the two azimuthal orientations is in the range of 0°±3°, preferably in the range of 0°±1°, more preferably in the range of 0°±0.5°.

For the light-diffusing layer 9, a diffusing film without polarization selectivity (having a haze not affected by polarization state of incident light) was used. The haze of the diffusing film was adjusted to 38.9% by dispersing filler in the binder. The light-diffusing layer may be a diffusing film having a surface embossed by imprint technology, for example. The haze of the light-diffusing layer 9 is preferably 20% or higher. In this case, the mirror display 1a can show sufficient diffuse reflectivity in the mirror mode. The haze of the light-diffusing layer 9 is more preferably 30% or higher but 80% or lower, particularly preferably 35% or higher but 70% or lower. In this case, the mirror display 1a can show sufficient diffuse reflectivity in the mirror mode while suppressing a decrease in transmittance (brightness of display) in the display mode. As in Example 2 described below, in the case where multiple light-diffusing layers 9 are stacked, the haze of the stacked layers as a whole is preferably 20% or higher, more preferably 30% or higher but 80% or lower, particularly preferably 35% or higher but 70% or lower.

Figure 2:
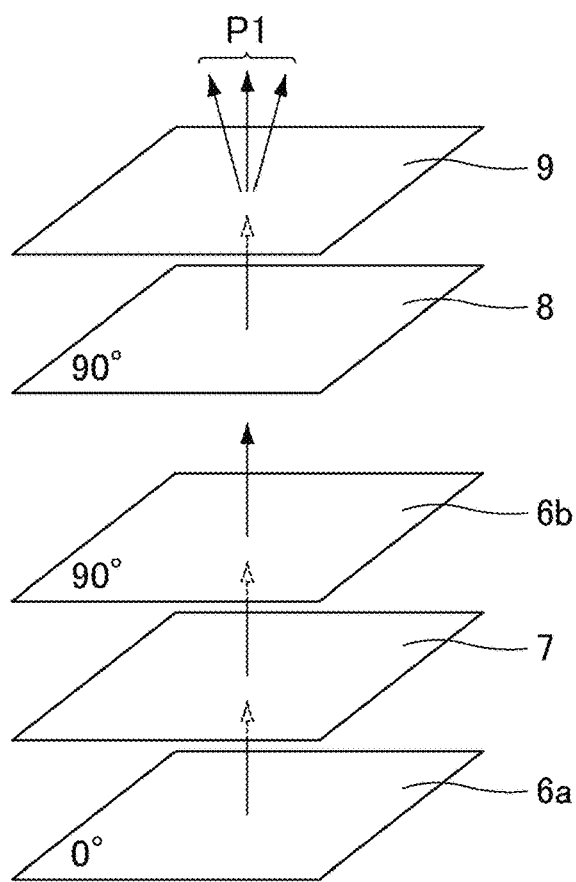
FIG. 2 is an explanatory view showing the operation principle of the mirror display of Example 1 in a display mode.
Figure 3:
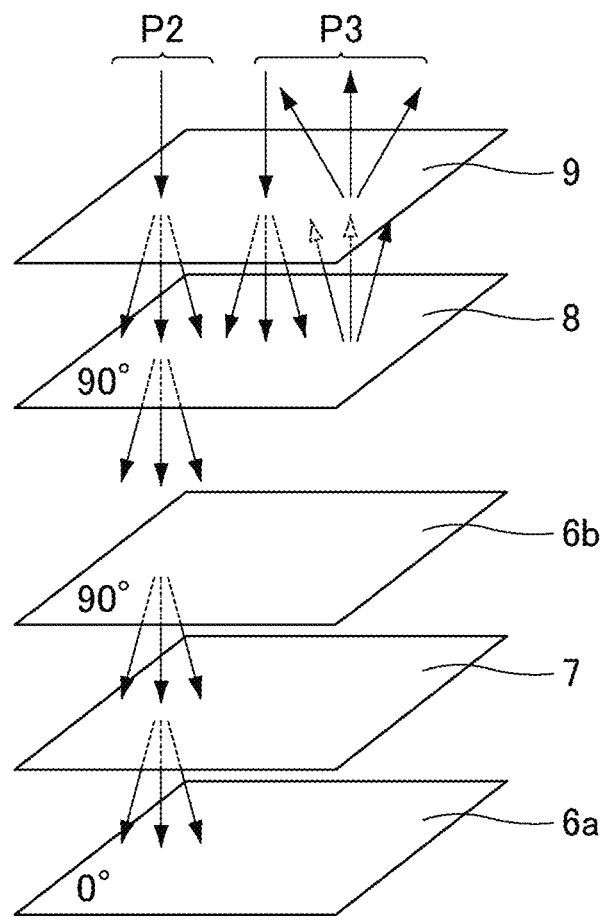
FIG. 3 is an explanatory view showing the operation principle of the mirror display of Example 1 in a mirror mode.

The mirror display of Example 1 can be operated in both the display mode and the mirror mode on the basis of the following principle. The operation principle is described with reference to FIG. 2 and FIG. 3. FIG. 2 is an explanatory view showing the operation principle of the mirror display of Example 1 in a display mode. FIG. 3 is an explanatory view showing the operation principle of the mirror display of Example 1 in a mirror mode. In FIG. 2 and FIG. 3, part of the mirror display shown in FIG. 1 is taken out and the members are shown apart from one another for convenience. The arrows in FIG. 2 and FIG. 3 indicate paths of light passing through each member. The linearly polarized light vibrating in an azimuth angle of 90° is also referred to as first polarized light, and the linearly polarized light vibrating in an azimuth angle of 0° is also referred to as second polarized light hereinafter. The same shall apply to each example.

In the display mode, the liquid crystal display panel 7 shows an image and a viewer observes the image on the liquid crystal display panel 7 through the half mirror plate 4a. As shown by paths P1 of light in FIG. 2, the light emitted from the liquid crystal display device 2 is the first polarized light. Since the transmission axis of the reflective polarizer 8 is at an azimuth angle of 90°, the first polarized light can pass through the reflective polarizer 8 with hardly any loss. Thus, the mirror display of Example 1 can show an image with a high luminance in spite of including the half mirror plate 4a. Unfortunately, since the first polarized light transmitted through the reflective polarizer 8 is diffused by the light-diffusing layer 9, the mirror display may have some decrease in luminance in the normal direction in the display mode compared to the case where no light-diffusing layer 9 is disposed. This may reduce sharpness of display and cause blurring of images.

In the mirror mode, the liquid crystal display panel 7 shows no image and a viewer observes only the outside light reflected by the half mirror plate 4a. As shown by paths P2 of light in FIG. 3, the first polarized light component among the light components incident on the half mirror plate 4a from the viewing surface side is diffused by the light-diffusing layer 9 and then passes through the reflective polarizer 8. The light components transmitted through the reflective polarizer 8 then pass through the absorptive polarizer 6b and the liquid crystal display panel 7 in the mentioned order, and are absorbed by the absorptive polarizer 6a in the end.

In contrast, as shown by paths P3 of light in FIG. 3, the second polarized light component among the light components incident on the half mirror plate 4a from the viewing surface side is diffused by the light-diffusing layer 9 and is then incident on the reflective polarizer 8 as diffusion light. Here, since the transmission axis of the reflective polarizer 8 is at an azimuth angle of 90°, i.e., the reflection axis thereof is at an azimuth angle of 0°, almost all of the light components incident on the reflective polarizer 8 are reflected by the reflective polarizer 8. The light components reflected by the reflective polarizer 8 are then diffused by the light-diffusing layer 9 and emitted to the viewing surface side.

In this manner, the mirror display of Example 1 can serve as a mirror. Moreover, the mirror display of Example 1, having a diffusely reflecting surface in the mirror mode, can match the peripheral environment having diffusely reflecting surfaces. For example, the mirror display in the mirror mode can also be blended into a white wall. The mirror display can be applied to a display that is built in the door or wall of a refrigerator to be integrated therewith.

Example 1 employed the configuration in which the transmission axis (azimuth angle: 90°) of the absorptive polarizer 6b and the transmission axis (azimuth angle: 90°) of the reflective polarizer 8 are substantially parallel to each other (as a result, the transmission axis (azimuth angle: 0°) of the absorptive polarizer 6a and the transmission axis (azimuth angle: 90°) of the reflective polarizer 8 are substantially perpendicular to each other). Here, as a modified example of Example 1, a configuration in which the transmission axis of the absorptive polarizer 6b and the transmission axis of the reflective polarizer 8 are not substantially parallel to each other (as a result, the transmission axis of the absorptive polarizer 6a and the transmission axis of the reflective polarizer 8 are not substantially perpendicular to each other) may be employed. If, however, the azimuth angle of the transmission axis of the reflective polarizer 8 is at an azimuth angle of 0°, the light emitted from the liquid crystal display device 2 cannot be transmitted to the viewing surface side as display light. Thus, from the view point of transmitting the light emitted from the liquid crystal display device 2 to the viewing surface side with a minimum loss, the configuration of Example 1 is preferred.

Although Example 1 employed the configuration in which the air layer 3 and the glass substrate 10 were disposed, a configuration without these members may be employed. An example thereof is a configuration in which the reflective polarizer 8 and the light-diffusing layer 9 are bonded in the mentioned order to the viewing surface side of the absorptive polarizer 6b with an acrylic adhesive in between to eliminate the air layer 3 and the glass substrate 10. Another example thereof is a configuration in which the reflective polarizer 8 is bonded to the back surface side of the glass substrate 10 and the light-diffusing layer 9 is bonded to the viewing surface side of the glass substrate 10. The same shall apply to each example.

Alternatively, the mirror display may employ a configuration in which a medium other than the air layer 3 and the glass substrate 10 is disposed. As long as the medium (e.g. a hard coat layer, an antireflection film, and a protective film with a low birefringence) does not affect the polarization state of transmitted light, the medium can be disposed between the absorptive polarizer 6b, the reflective polarizer 8, and the light-diffusing layer 9 without affecting the operation of the mirror display. The same shall apply to each example.

EXAMPLE 2

Example 2 relates to a mirror display including a liquid crystal display device, a reflective polarizer as a half mirror layer, and a light-diffusing layer as a light-diffusing member. The difference from Example 1 is the number of light-diffusing layers disposed. The mirror display of Example 2 is the same as that of Example 1 except for the above configuration, so that the explanation of the same respects is omitted here.

Figure 4:
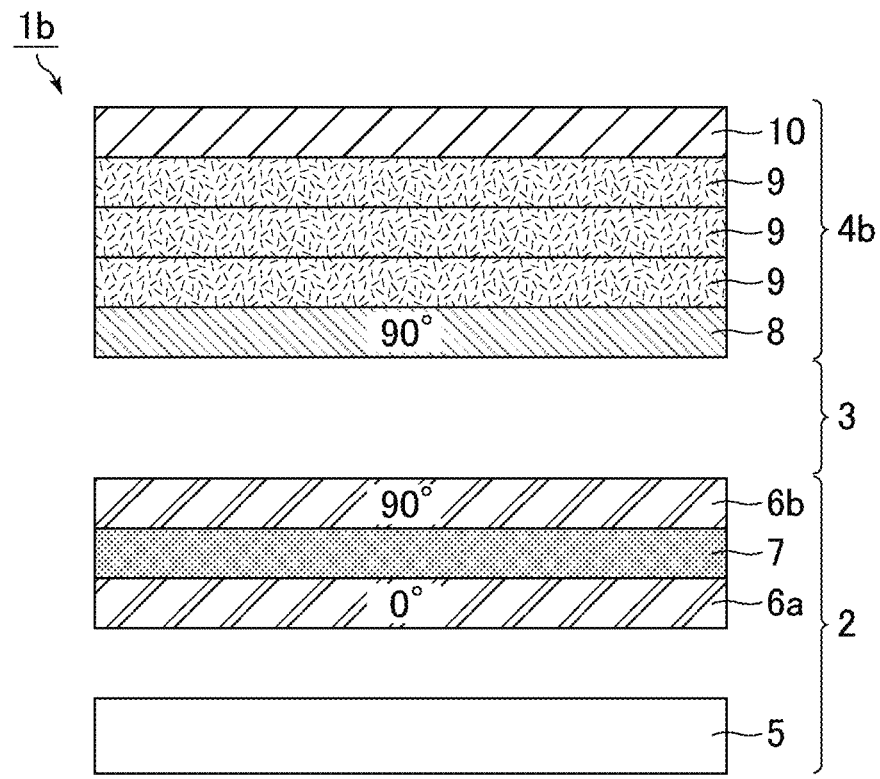
FIG. 4 is a schematic cross-sectional view showing a mirror display of Example 2.

FIG. 4 is a schematic cross-sectional view showing a mirror display of Example 2. As shown in FIG. 4, the mirror display 1b includes, in the order from the back surface side toward the viewing surface side, the liquid crystal display device 2, the air layer 3, and a half mirror plate 4b.

The half mirror plate 4b includes, in the order from the back surface side toward the viewing surface side, the reflective polarizer 8 as a half mirror layer, three light-diffusing layers 9 as a light-diffusing member, and the glass substrate 10 as a base material supporting the half mirror layer.

The stack of the three light-diffusing layers 9 used, having a haze of 68.6% as a whole, had a higher haze than the light-diffusing layer of Example 1. Example 2 employed a simple configuration including the stack of the three light-diffusing layers 9 to enhance the haze of the light-diffusing layers. Alternatively, a stack of a different number of light-diffusing layers may be used. Also, a diffusing film may be used whose haze is increased by increasing the amount of filler.

The operation principle in the display mode and mirror mode of the mirror display of Example 2 is the same as that in Example 1 except for the difference due to the different number of the light-diffusing layers 9 disposed, so that the explanation thereof is omitted here. The mirror display of Example 2, also having a diffusely reflecting surface in the mirror mode, can match the peripheral environment having diffusely reflecting surfaces. Furthermore, having a larger number of the light-diffusing layers 9, the mirror display of Example 2 can show higher diffuse reflectivity than the mirror display of Example 1.

EXAMPLE 3

Example 3 relates to a mirror display that includes a liquid crystal display device, a reflective polarizer as a half mirror layer, and a polarized-light-diffusing layer as a light-diffusing member. The difference from Example 1 is that a polarized-light-diffusing layer is used as a light-diffusing member in place of the light-diffusing layer. The mirror display of Example 3 is the same as the mirror display of Example 1 except for the above configuration, so that the explanation of the same respects is omitted here.

Figure 5:
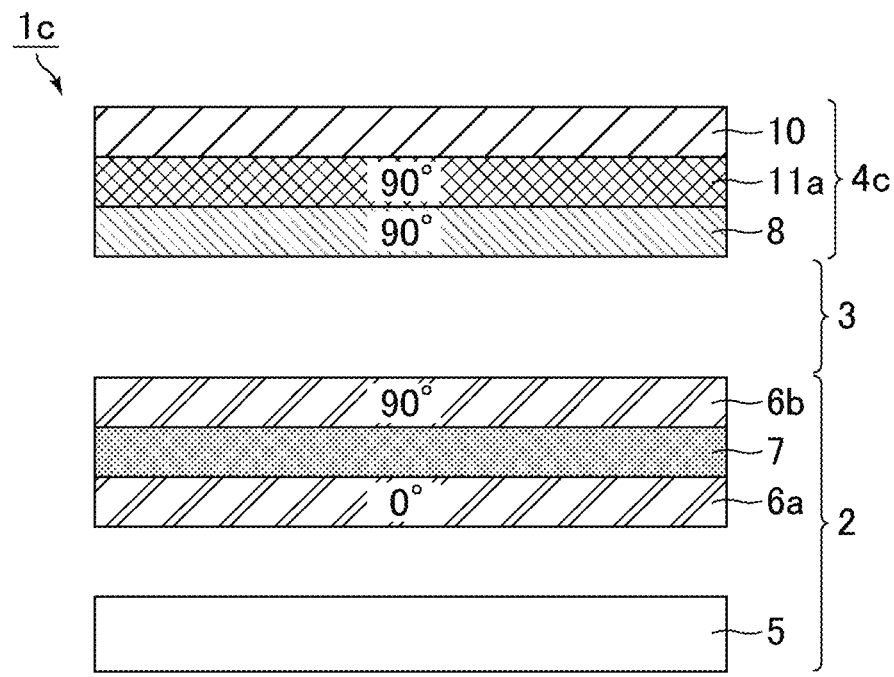
FIG. 5 is a schematic cross-sectional view showing a mirror display of Example 3.

FIG. 5 is a schematic cross-sectional view showing a mirror display of Example 3. As shown in FIG. 5, a mirror display 1c includes, in the order from the back surface side toward the viewing surface side, the liquid crystal display device 2, the air layer 3, and a half mirror plate 4c.

The half mirror plate 4c includes, in the order from the back surface side toward the viewing surface side, the reflective polarizer 8 as a half mirror layer, a polarized-light-diffusing layer 11a as a light-diffusing member, and the glass substrate 10 as a base material supporting the half mirror layer.

For the polarized-light-diffusing layer 11a, a polarized-light-diffusing film was used with the azimuth angle of the transmission axis thereof set to 90°. The polarized-light-diffusing film was prepared to have a prescribed haze with reference to the method disclosed in Patent Literature 1. The haze in the azimuthal orientation of the transmission axis of the polarized-light-diffusing layer 11a was lower than the haze in the azimuthal orientation of the diffusion axis thereof. That is, the haze in the azimuthal orientation of the transmission axis of the polarized-light-diffusing layer 11a was set to 13.2%, the haze in the azimuthal orientation of the diffusion axis thereof was set to 48.7%, and the average value of these hazes was 30.95%. The transmission axis of the polarized-light-diffusing film (polarized-light-diffusing layer) herein refers to, for example, the stretch axis when the film is produced by the method disclosed in Patent Literature 1, and the film can efficiently transmit linearly polarized light vibrating along the transmission axis. The diffusion axis of the polarized-light-diffusing film (polarized-light-diffusing layer) refers to the azimuthal orientation perpendicular to the azimuthal orientation of the transmission axis, and the film can diffuse the polarized light vibrating along the diffusion axis. The haze in the azimuthal orientation of the transmission axis refers to a haze measured using polarized light vibrating along the transmission axis as a measurement light source. The haze in the azimuthal orientation of the diffusion axis refers to a haze measured using polarized light vibrating along the diffusion axis as a measurement light source.

Figure 6:
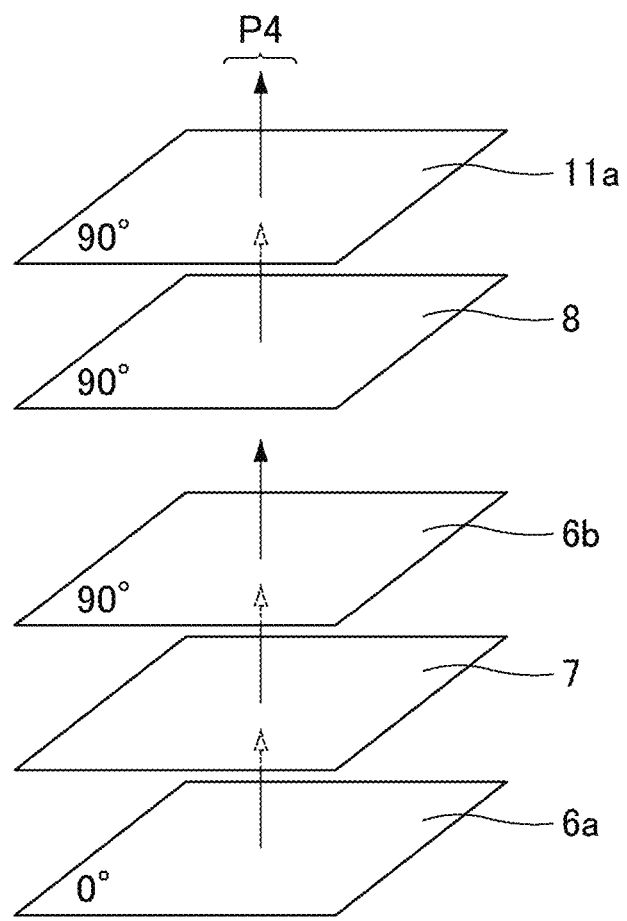
FIG. 6 is an explanatory view showing the operation principle of the mirror display of Example 3 in a display mode.
Figure 7:
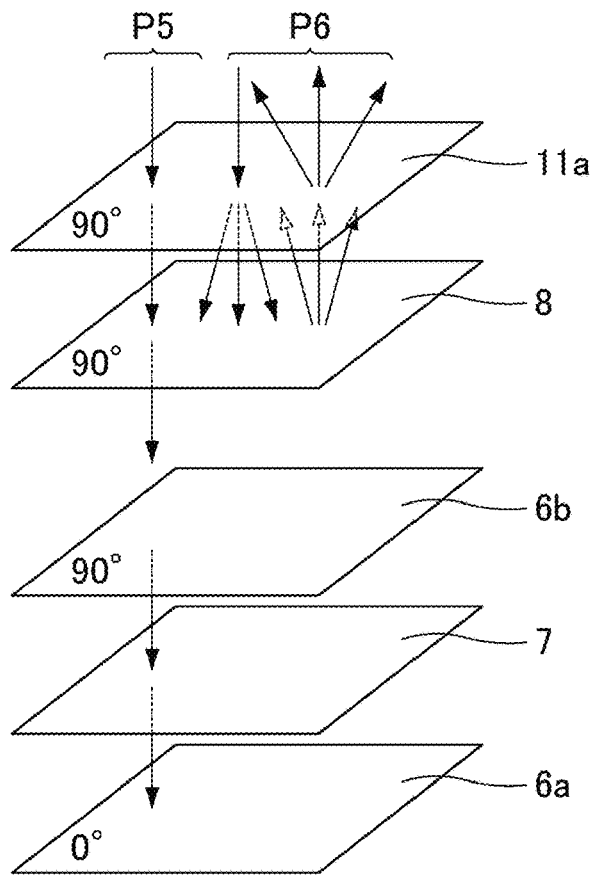
FIG. 7 is an explanatory view showing the operation principle of the mirror display of Example 3 in a mirror mode.

The mirror display of Example 3 can be operated in both the display mode and the mirror mode by the following principle. The operation principle is described below with reference to FIG. 6 and FIG. 7. FIG. 6 is an explanatory view showing the operation principle of the mirror display of Example 3 in a display mode. FIG. 7 is an explanatory view showing the operation principle of the mirror display of Example 3 in a mirror mode. In FIG. 6 and FIG. 7, part of the mirror display shown in FIG. 5 is taken out and the members are shown apart from one another for convenience. The arrows in FIG. 6 and FIG. 7 indicate paths of light passing through each member.

In the display mode, as shown by paths P4 of light in FIG. 6, the light emitted from the liquid crystal display device 2 is the first polarized light. Since the transmission axis of the reflective polarizer 8 is at an azimuth angle of 90°, the first polarized light can pass through the reflective polarizer 8 with hardly any loss. The first polarized light transmitted through the reflective polarizer 8 is then incident on the polarized-light-diffusing layer 11a. Since the transmission axis of the polarized-light-diffusing layer 11a is at an azimuth angle of 90° that is the same as the azimuth angle of the transmission axis of the reflective polarizer 8, the first polarized light can pass through the polarized-light-diffusing layer 11a without being diffused. Thus, the mirror display of Example 3 can show an image with a high luminance in spite of including the half mirror plate 4c. Additionally, the mirror display of Example 3 is free from the possibility of troubles concerned in the mirror display of Example 1, such as a decrease in luminance and blurring of images in the display mode.

In the mirror mode, as shown by paths P5 of light in FIG. 7, the first polarized light component among the light components incident on the half mirror plate 4c from the viewing surface side passes through the polarized-light-diffusing layer 11a and the reflective polarizer 8 in the mentioned order. The first polarized light component transmitted through the reflective polarizer 8 then passes through the absorptive polarizer 6b and the liquid crystal display panel 7 in the mentioned order, and is absorbed by the absorptive polarizer 6a in the end.

Meanwhile, as shown by paths P6 of light in FIG. 7, the second polarized light component among the light components incident on the half mirror plate 4c from the viewing surface side is diffused by the polarized-light-diffusing layer 11a whose transmission axis is at an azimuth angle of 90°, i.e., whose diffusion axis is at an azimuth angle of 0°, and is incident on the reflective polarizer 8 as diffusion light. Here, since the transmission axis of the reflective polarizer 8 is at an azimuth angle of 90°, i.e., the reflection axis thereof is at an azimuth angle of 0°, almost all of the light components incident on the reflective polarizer 8 are reflected by the reflective polarizer 8. Then, the light components reflected by the reflective polarizer 8 are diffused by the polarized-light-diffusing layer 11a and emitted to the viewing surface side.

In this manner, the mirror display of Example 3 can serve as a mirror. Additionally, the mirror display of Example 3, having a diffusely reflecting surface in the mirror mode, can match the peripheral environment having diffusely reflecting surfaces.

EXAMPLE 4

Example 4 relates to a mirror display that includes a liquid crystal display device, a reflective polarizer as a half mirror layer, and a polarized-light-diffusing layer as a light-diffusing member. The difference from Example 3 is the value of the haze of the polarized-light-diffusing layer. The mirror display of Example 4 is the same as the mirror display of Example 3 except for the above configuration, so that the explanation of the same respects is omitted here.

Figure 8:
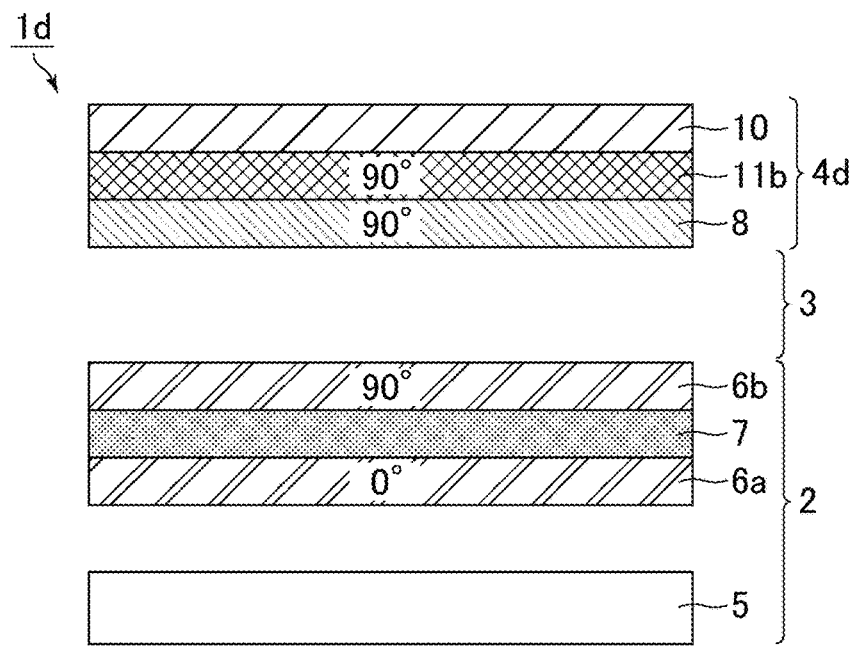
FIG. 8 is a schematic cross-sectional view showing a mirror display of Example 4.

FIG. 8 is a schematic cross-sectional view showing a mirror display of Example 4. As shown in FIG. 8, a mirror display 1d includes, in the order from the back surface side toward the viewing surface side, the liquid crystal display device 2, the air layer 3, and a half mirror plate 4d.

The half mirror plate 4d includes, in the order from the back surface side toward the viewing surface side, the reflective polarizer 8 as a half mirror layer, a polarized-light-diffusing layer 11b as a light-diffusing member, and the glass substrate 10 as a base material supporting the half mirror layer.

For the polarized-light-diffusing layer 11b, a polarized-light-diffusing film prepared by the method used for the polarized-light-diffusing layer 11a was used with the azimuth angle of the transmission axis thereof set to 90°. The haze in the azimuthal orientation of the transmission axis of the polarized-light-diffusing layer 11b was set to 70.0%, the haze in the azimuthal orientation of the diffusion axis thereof was set to 20.6%, and the average value of these hazes was 45.3%.

The operation principle of the mirror display of Example 4 in the display mode and mirror mode is the same as that in Example 3 except for the difference due to the different hazes of the respective polarized-light-diffusing layers, so that the explanation of the principle is omitted here. The mirror display of Example 4, also having a diffusely reflecting surface in the mirror mode, can match the peripheral environment having diffusely reflecting surfaces. Moreover, having a higher haze of the polarized-light-diffusing layer, the mirror display of Example 4 can show higher diffuse reflectivity than the mirror display of Example 3.

EXAMPLE 5

Example 5 relates to a mirror display that includes a liquid crystal display device, a reflective polarizer as a half mirror layer, and a polarized-light-diffusing layer as a light-diffusing member. The difference from Example 3 is the value of the haze of the polarized-light-diffusing layer. The mirror display of Example 5 is the same as the mirror display of Example 3 except for the above configuration, so that the explanation of the same respects is omitted here.

Figure 9:
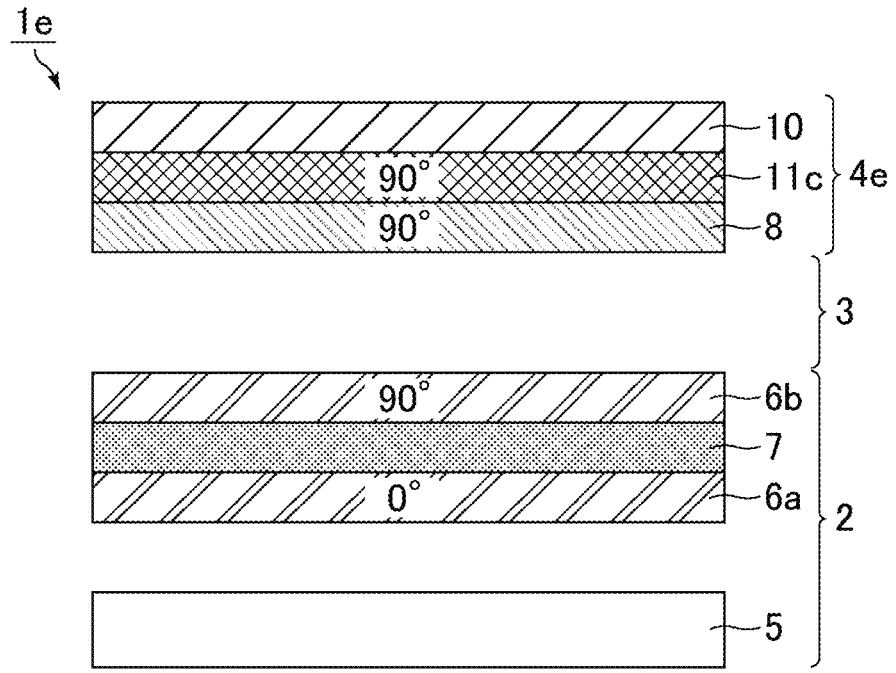
FIG. 9 is a schematic cross-sectional view showing a mirror display of Example 5.

FIG. 9 is a schematic cross-sectional view showing a mirror display of Example 5. As shown in FIG. 9, a mirror display 1e includes, in the order from the back surface side toward the viewing surface side, the liquid crystal display device 2, the air layer 3, and a half mirror plate 4e.

The half mirror plate 4e includes, in the order from the back surface side toward the viewing surface side, the reflective polarizer 8 as a half mirror layer, a polarized-light-diffusing layer 11c as a light-diffusing member, and the glass substrate 10 as a base material supporting the half mirror layer.

For the polarized-light-diffusing layer 11c, a polarized-light-diffusing film prepared by the method used for the polarized-light-diffusing layer 11a was used with the azimuth angle of the transmission axis thereof set to 90°. The haze in the azimuthal orientation of the transmission axis of the polarized-light-diffusing layer 11c was set to 75.6%, the haze in the azimuthal orientation of the diffusion axis thereof was set to 28.2%, and the average value of these hazes was 51.9%.

The operation principle of the mirror display of Example 5 in the display mode and mirror mode is the same as that in Example 3 except for the difference due to the different hazes of the respective polarized-light-diffusing layers, so that the explanation of the principle is omitted here. The mirror display of Example 5, also having a diffusely reflecting surface in the mirror mode, can match the peripheral environment having diffusely reflecting surfaces. Moreover, having a still higher haze of the polarized-light-diffusing layer, the mirror display of Example 5 can show higher diffuse reflectivity than the mirror displays of Examples 3 and 4.

The haze in the azimuthal orientation of the diffusion axis of the polarized-light-diffusing layer used in each of Examples 3 to 5 is preferably 20% or higher. In this case, the mirror display can show sufficient diffuse reflectivity in the mirror mode. The haze in the azimuthal orientation of the diffusion axis of the polarized-light-diffusing layer is more preferably 40% or higher, particularly preferably 70% or higher. The haze in the azimuthal orientation of the transmission axis of the polarized-light-diffusing layer is preferably 30% or lower, more preferably 20% or lower. In this case, the mirror display can show sufficient diffuse reflectivity in the mirror mode while suppressing a decrease in transmittance (brightness of display) in the display mode. Here, the haze in the azimuthal orientation of the diffusion axis of the polarized-light-diffusing layer relates to the diffuse reflectivity in the mirror mode, and the haze in the azimuthal orientation of the transmission axis of the polarized-light-diffusing layer relates to the transmittance (brightness of display) in the display mode.

EXAMPLE 6

Example 6 relates to a mirror display that includes a liquid crystal display device, a reflective polarizer as a half mirror layer, and a polarized-light-diffusing layer as a light-diffusing member. The difference from Example 3 is use of a switching region in place of the glass substrate. The mirror display of Example 6 is the same as the mirror display of Example 3 except for the above configuration, so that the explanation of the same respects is omitted here.

Figure 10:
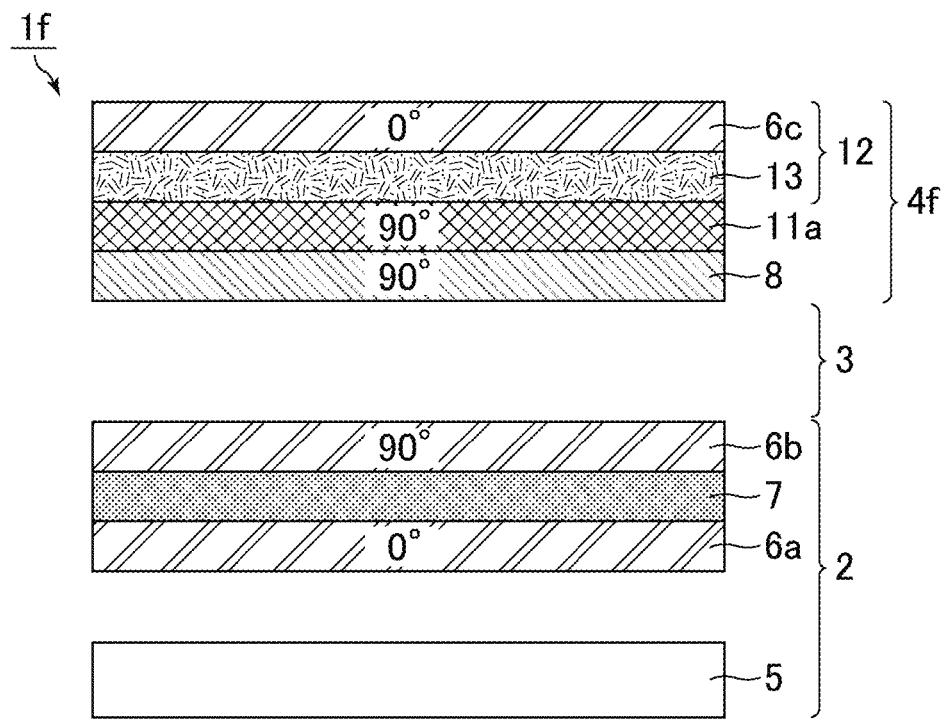
FIG. 10 is a schematic cross-sectional view showing a mirror display of Example 6.

FIG. 10 is a schematic cross-sectional view showing a mirror display of Example 6. As shown in FIG. 10, a mirror display 1f includes, in the order from the back surface side toward the viewing surface side, the liquid crystal display device 2, the air layer 3, and a half mirror plate 4f.

The half mirror plate 4f includes, in the order from the back surface side toward the viewing surface side, the reflective polarizer 8 as a half mirror layer, the polarized-light-diffusing layer 11a as a light-diffusing member, and a switching region 12.

The switching region 12 includes, in the order from the back surface side toward the viewing surface side, a switching liquid crystal display panel 13 and an absorptive polarizer 6c whose transmission axis is set at an azimuth angle of 0°. The reflective polarizer 8 was bonded to a glass substrate (not shown) constituting the switching liquid crystal display panel 13 with an acrylic adhesive (not shown) in between. The transmission axis (azimuth angle: 0°) of the absorptive polarizer 6c and the transmission axis (azimuth angle: 90°) of the reflective polarizer 8 are substantially perpendicular to each other. The switching region 12 can switch the state in which light can penetrate the mirror display 1f from the viewing surface side to the liquid crystal display device 2 and the state in which light cannot penetrate the mirror display 1f from the viewing surface side to the liquid crystal display device 2.

For the switching liquid crystal display panel 13, a monochrome liquid crystal display panel of $UV^2A$ mode with a phase difference of 320 nm was used. The monochrome liquid crystal display panel is a liquid crystal display panel without a color filter layer. The switching liquid crystal display panel 13 may be any type of liquid crystal display panel that can change the vibration direction of the linearly polarized light transmitted through the reflective polarizer 8 and the polarized-light-diffusing layer 11a in response to the voltage-applied state and the no-voltage-applied state. For example, a liquid crystal display panel of twisted nematic (TN) mode or in-plane switching (IPS) mode may be used.

Since the mirror display of Example 6 is provided with three absorptive polarizers 6a, 6b, and 6c, a decrease in transmittance or yellowing of transparent color is concerned in the display mode. In order to minimize such deterioration in display quality, at least one of the absorptive polarizers 6a, 6b, and 6c is preferably adjusted to have an increased transmittance or to be mixed with a reduced amount of ultraviolet (UV) absorber. Increasing the transmittance of the absorptive polarizer(s) may decrease the degree of polarization thereof. This will not affect the performance of the mirror display as long as the absorptive polarizers 6a, 6b, and 6c and the reflective polarizer 8 as a whole achieve a necessary degree of polarization. The UV resistant performance may be considered similarly to the above.

Figure 11:
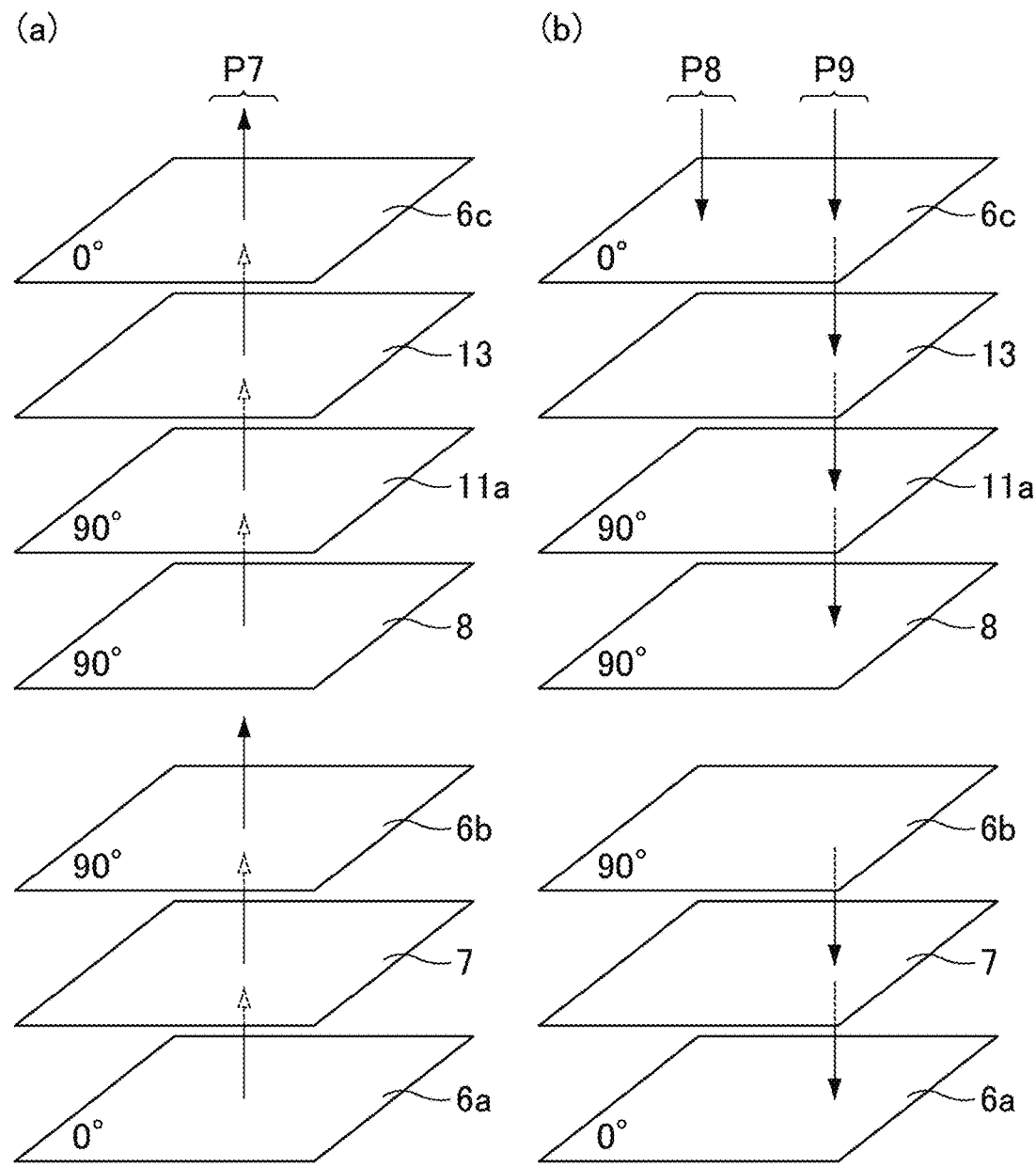
FIG. 11 includes explanatory views showing the operation principle of the mirror display of Example 6 in a display mode.
Figure 12:
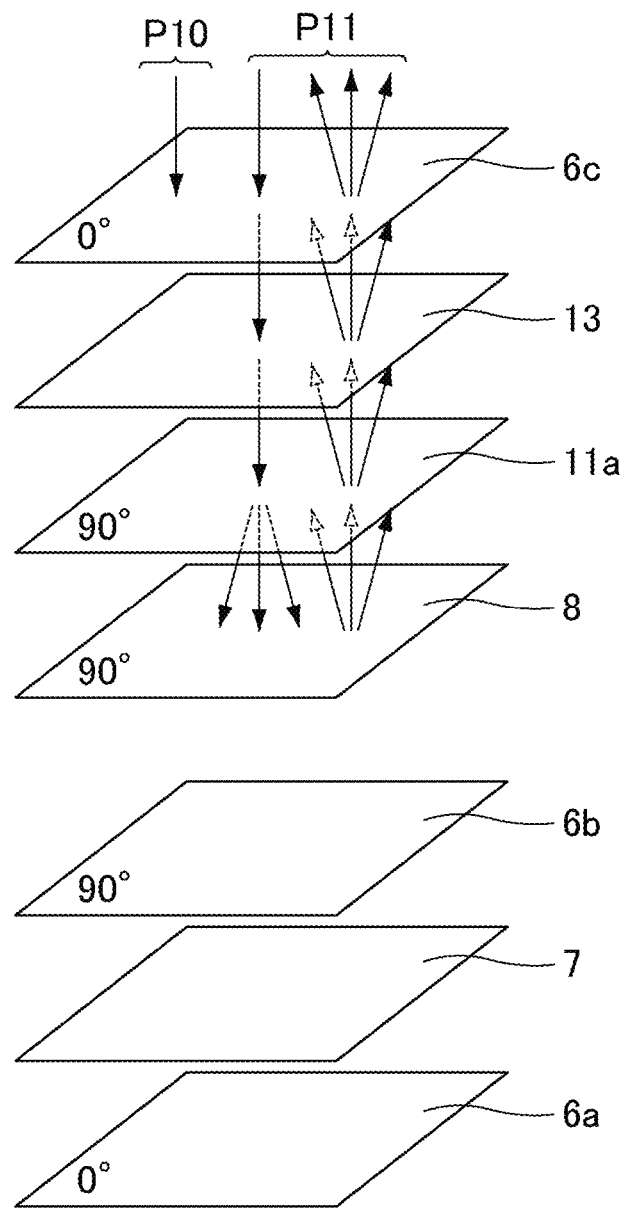
FIG. 12 is an explanatory view showing the operation principle of the mirror display of Example 6 in a mirror mode.

The mirror display of Example 6 can be operated in both the display mode and the mirror mode on the basis of the following principle. The operation principle is described below with reference to FIG. 11 and FIG. 12. FIG. 11 includes explanatory views showing the operation principle of the mirror display of Example 6 in a display mode. FIG. 12 is an explanatory view showing the operation principle of the mirror display of Example 6 in a mirror mode. In FIG. 11 and FIG. 12, part of the mirror display shown in FIG. 10 is taken out and the members are shown apart from one another for convenience. The arrows in FIG. 11 and FIG. 12 indicate paths of light passing through each member.

In the display mode, as shown by paths P7 of light in FIG. 11(*a*), the light emitted from the liquid crystal display device 2 is the first polarized light. Since the transmission axis of the reflective polarizer 8 is at an azimuth angle of 90°, the first polarized light can pass through the reflective polarizer 8 with hardly any loss. The first polarized light transmitted through the reflective polarizer 8 is then incident on the polarized-light-diffusing layer 11a. Since the transmission axis of the polarized-light-diffusing layer 11a is at an azimuth angle of 90° that is the same as the azimuth angle of the transmission axis of the reflective polarizer 8, the first polarized light can pass through the polarized-light-diffusing layer 11a without being diffused. The switching liquid crystal display panel 13, being in a voltage-applied state in the display mode, converts the vibration direction of the first polarized light transmitted through the polarized-light-diffusing layer 11a into an azimuth angle of 0°. As a result, the light transmitted through the switching liquid crystal display panel 13 is converted into the second polarized light. Since the transmission axis of the absorptive polarizer 6c is at an azimuth angle of 0°, the second polarized light can pass through the absorptive polarizer 6c with hardly any loss. Thus, the mirror display of Example 6 can show an image with a high luminance in spite of including the half mirror plate 4f. Additionally, the mirror display of Example 6 is free from the possibility of troubles such as a decrease in luminance or blurring of images in the display mode, as in the mirror displays of Examples 3 to 5.

Next, the following describes the behavior of light incident on the half mirror plate 4f from the viewing surface side in the display mode. In the above stated Examples 3 to 5, only the behavior of the light emitted from the liquid crystal display device in the display mode was described. In fact, outside light is usually incident on the mirror display from the viewing surface side also in the display mode. Thus, diffusely reflected outside light is observed together with display light in the display mode in Examples 3 to 5. The mechanism of diffuse reflection of outside light is the same as the operation principle in the mirror mode already described with reference to FIG. 7. Such diffusely reflected outside light may reduce the contrast in the display mode to cause a decrease in visibility. This is because the diffusely reflected outside light causes whitishness in the region of black display.

In the display mode, as shown by paths P8 of light in FIG. 11(*b*), the first polarized light component among the light components incident on the half mirror plate 4f from the viewing surface side is absorbed by the absorptive polarizer 6c whose transmission axis is at an azimuth angle of 0°, i.e., whose absorption axis is at an azimuth angle of 90°.

Meanwhile, as shown by paths P9 of light in FIG. 11(*b*), the second polarized light component among the light components incident on the half mirror plate 4f from the viewing surface side can pass through the absorptive polarizer 6c. Here, the switching liquid crystal display panel 13, being in a voltage-applied state in the display mode, converts the vibration direction of the second polarized light transmitted through the absorptive polarizer 6c into an azimuth angle of 90°. As a result, the light transmitted through the switching liquid crystal display panel 13 is converted into the first polarized light and thus can pass through the polarized-light-diffusing layer 11a and the reflective polarizer 8 with hardly any loss. Then, the first polarized light transmitted through the reflective polarizer 8 passes through the absorptive polarizer 6b and the liquid crystal display panel 7 in the mentioned order, and is absorbed by the absorptive polarizer 6a in the end.

As mentioned above, the mirror display of Example 6 is free from diffuse reflection of outside light in the display mode, thereby showing better visibility than the mirror displays of Examples 3 to 5.

In the mirror mode, as shown by paths P10 of light in FIG. 12, the first polarized light component among the light components incident on the half mirror plate 4f from the viewing surface side is absorbed by the absorptive polarizer 6c.

Meanwhile, as shown by paths P11 of light in FIG. 12, the second polarized light component among the light components incident on the half mirror plate 4f from the viewing surface side can pass through the absorptive polarizer 6c. Additionally, the switching liquid crystal display panel 13, being in a no-voltage-applied state in the mirror mode, does not convert the vibration direction of the second polarized light transmitted through the absorptive polarizer 6c. As a result, the light transmitted through the switching liquid crystal display panel 13 remains as the second polarized light and is diffused by the polarized-light-diffusing layer 11a whose transmission axis is at an azimuth angle of 90°, i.e., whose diffusion axis is at an azimuth angle of 0°, and is incident on the reflective polarizer 8 as diffusion light. Here, since the transmission axis of the reflective polarizer 8 is at an azimuth angle of 90°, i.e., the reflection axis thereof is at an azimuth angle of 0°, almost all of the light components incident on the reflective polarizer 8 are reflected by the reflective polarizer 8. Then, the light reflected by the reflective polarizer 8 is diffused by the polarized-light-diffusing layer 11a, passes through the switching liquid crystal display panel 13 and the absorptive polarizer 6c in the mentioned order, and is then emitted to the viewing surface side.

In this manner, the mirror display of Example 6 can serve as a mirror. Additionally, the mirror display of Example 6, having a diffusely reflecting surface in the mirror mode, can match the peripheral environment having diffusely reflecting surfaces.

EXAMPLE 7

Example 7 relates to a mirror display that includes a liquid crystal display device, a reflective polarizer as a half mirror layer, and a polarized-light-diffusing layer as a light-diffusing member. The difference from Example 6 is that the haze of the polarized-light-diffusing layer was the same as that of Example 4. The mirror display of Example 7 is the same as the mirror display of Example 6 except for the above configuration, so that the explanation of the same respects is omitted here.

Figure 13:
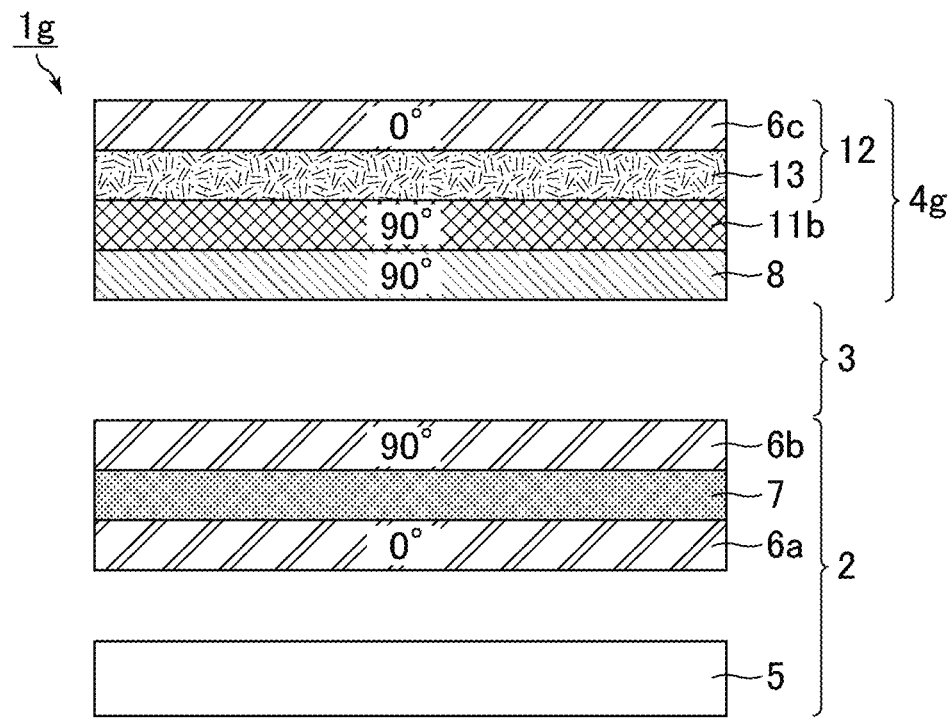
FIG. 13 is a schematic cross-sectional view showing a mirror display of Example 7.

FIG. 13 is a schematic cross-sectional view showing a mirror display of Example 7. As shown in FIG. 13, a mirror display 1g includes, in the order from the back surface side toward the viewing surface side, the liquid crystal display device 2, the air layer 3, and a half mirror plate 4g.

The half mirror plate 4g includes, in the order from the back surface side toward the viewing surface side, the reflective polarizer 8 as a half mirror layer, the polarized-light-diffusing layer 11b as a light-diffusing member, and the switching region 12.

The operation principle of the mirror display of Example 7 in the display mode and mirror mode is the same as that in Example 6 except for the difference due to the different hazes of the respective polarized-light-diffusing layers, so that the explanation of the principle is omitted here. The mirror display of Example 7, also having a diffusely reflecting surface in the mirror mode, can match the peripheral environment having diffusely reflecting surfaces. Moreover, having a higher haze of the polarized-light-diffusing layer, the mirror display of Example 7 can show higher diffuse reflectivity than the mirror display of Example 6.

EXAMPLE 8

Example 8 relates to a mirror display that includes a liquid crystal display device, a reflective polarizer as a half mirror layer, and a polarized-light-diffusing layer as a light-diffusing member. The difference from Example 6 is that the haze of the polarized-light-diffusing layer was the same as that of Example 5. The mirror display of Example 8 is the same as the mirror display of Example 6 except for the above configuration, so that the explanation of the same respects is omitted here.

Figure 14:
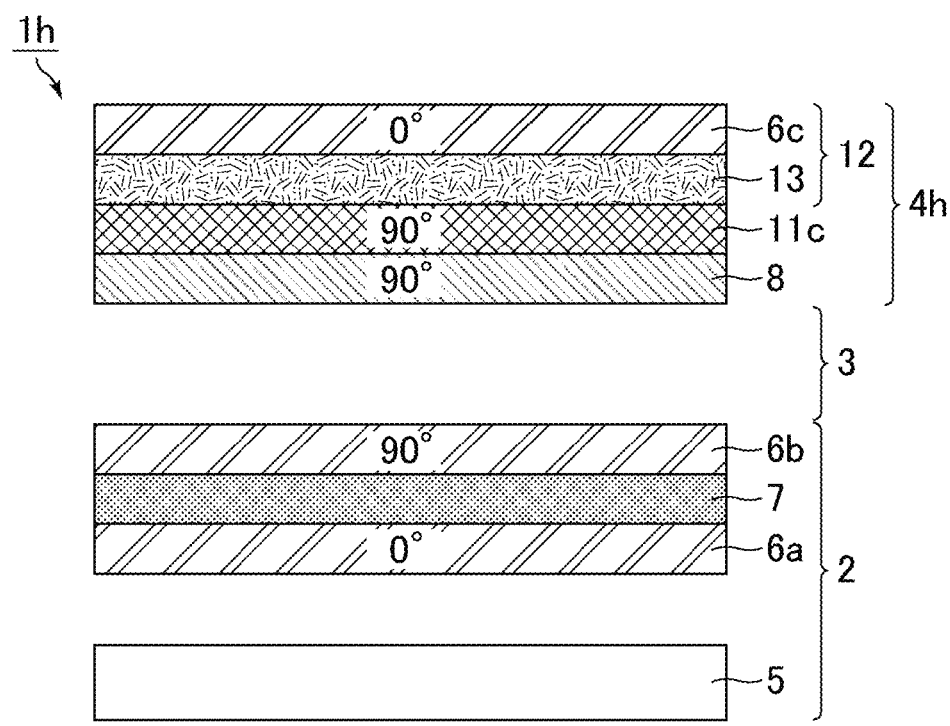
FIG. 14 is a schematic cross-sectional view showing a mirror display of Example 8.

FIG. 14 is a schematic cross-sectional view showing a mirror display of Example 8. As shown in FIG. 14, a mirror display 1h includes, in the order from the back surface side toward the viewing surface side, the liquid crystal display device 2, the air layer 3, and a half mirror plate 4h.

The half mirror plate 4h includes, in the order from the back surface side toward the viewing surface side, the reflective polarizer 8 as a half mirror layer, the polarized-light-diffusing layer 11c as a light-diffusing member, and the switching region 12.

The operation principle of the mirror display of Example 8 in the display mode and mirror mode is the same as that in Example 6 except for the difference due to the different hazes of the respective polarized-light-diffusing layers, so that the explanation of the principle is omitted here. The mirror display of Example 8, also having a diffusely reflecting surface in the mirror mode, can match the peripheral environment having diffusely reflecting surfaces. Moreover, having a higher haze of the polarized-light-diffusing layer, the mirror display of Example 8 can show higher diffuse reflectivity than the mirror displays of Examples 6 and 7.

Examples 6 to 8 employed the configuration in which the transmission axis (azimuth angle: 0°) of the absorptive polarizer 6c and the transmission axis (azimuth angle: 90°) of the reflective polarizer 8 are substantially perpendicular to each other. Here, a modified example of Examples 6 to 8 may be employed with a configuration in which the transmission axis of the absorptive polarizer 6c and the transmission axis of the reflective polarizer 8 are substantially parallel to each other. Such a configuration may be achieved through a modification of the configuration of one of Examples 6 to 8 by setting the transmission axis of the absorptive polarizer 6c at an azimuth angle of 90°, accompanied by operating the switching liquid crystal display panel 13 in a no-voltage-applied state in the display mode and in a voltage-applied state in the mirror mode. Unfortunately, this case requires one of the liquid crystal display panel 7 and the switching liquid crystal display panel 13 to be in a voltage-applied state in both the display mode and the mirror mode. From the view point that the mirror display can be with zero power consumption in one of the modes, the configurations of Examples 6 to 8 are preferred.

EXAMPLE 9

Example 9 relates to a mirror display that includes a liquid crystal display device, a reflective polarizer as a half mirror layer, and a polymer-dispersed liquid crystal display panel as a light-diffusing member. The difference from Example 1 is use of the polymer-dispersed liquid crystal display panel as a light-diffusing member in place of the light-diffusing layer. The mirror display of Example 9 is the same as the mirror display of Example 1 except for the above configuration, so that the explanation of the same respects is omitted here.

Figure 15:
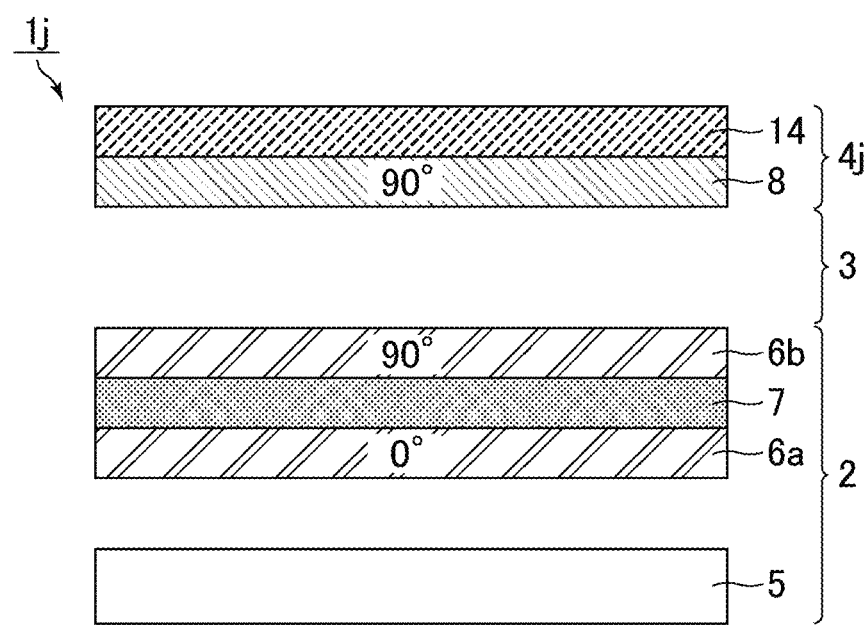
FIG. 15 is a schematic cross-sectional view showing a mirror display of Example 9.

FIG. 15 is a schematic cross-sectional view showing a mirror display of Example 9. As shown in FIG. 15, a mirror display 1j includes, in the order from the back surface side toward the viewing surface side, the liquid crystal display device 2, the air layer 3, and a half mirror plate 4j.

The half mirror plate 4j includes, in the order from the back surface side toward the viewing surface side, the reflective polarizer 8 as a half mirror layer and a polymer-dispersed liquid crystal display panel 14 as a light-diffusing member. The reflective polarizer 8 was bonded to a glass substrate (not shown) constituting the polymer-dispersed liquid crystal display panel 14 with an acrylic adhesive (not shown) in between.

The polymer-dispersed liquid crystal display panel is a complex consisting of nematic liquid crystal and a polymer, and the liquid crystal is dispersed in a polymer matrix as fine-particle droplets. The polymer-dispersed liquid crystal display panel can control the scattering and transmission of light utilizing the effect of light scattering of the complex. The polymer-dispersed liquid crystal display panel reaches a transparent state (transmission state) in a voltage-applied state where the refractive index is substantially the same between the liquid crystal and the polymer. In contrast, the polymer-dispersed liquid crystal display panel reaches a non-transparent state (scattering state) in a no-voltage-applied state where the dispersed liquid crystal (fine-particle droplets) has alignment vectors with different directions and thus light is scattered on the interface. The polymer-dispersed liquid crystal display panel 14 used was produced by the method of sealing a mixture, in which a nematic liquid crystal material and a photocurable resin are both dissolved, between a pair of substrates and polymerizing the photocurable resin under irradiation with light. The haze in the scattering state of the polymer-dispersed liquid crystal display panel 14 was set to 43.2%. The haze in the scattering state of the polymer-dispersed liquid crystal display panel 14 is preferably 20% or higher, more preferably 40% or higher. In this case, the mirror display 1j can show sufficient diffuse reflectivity in the mirror mode.

Figure 16:
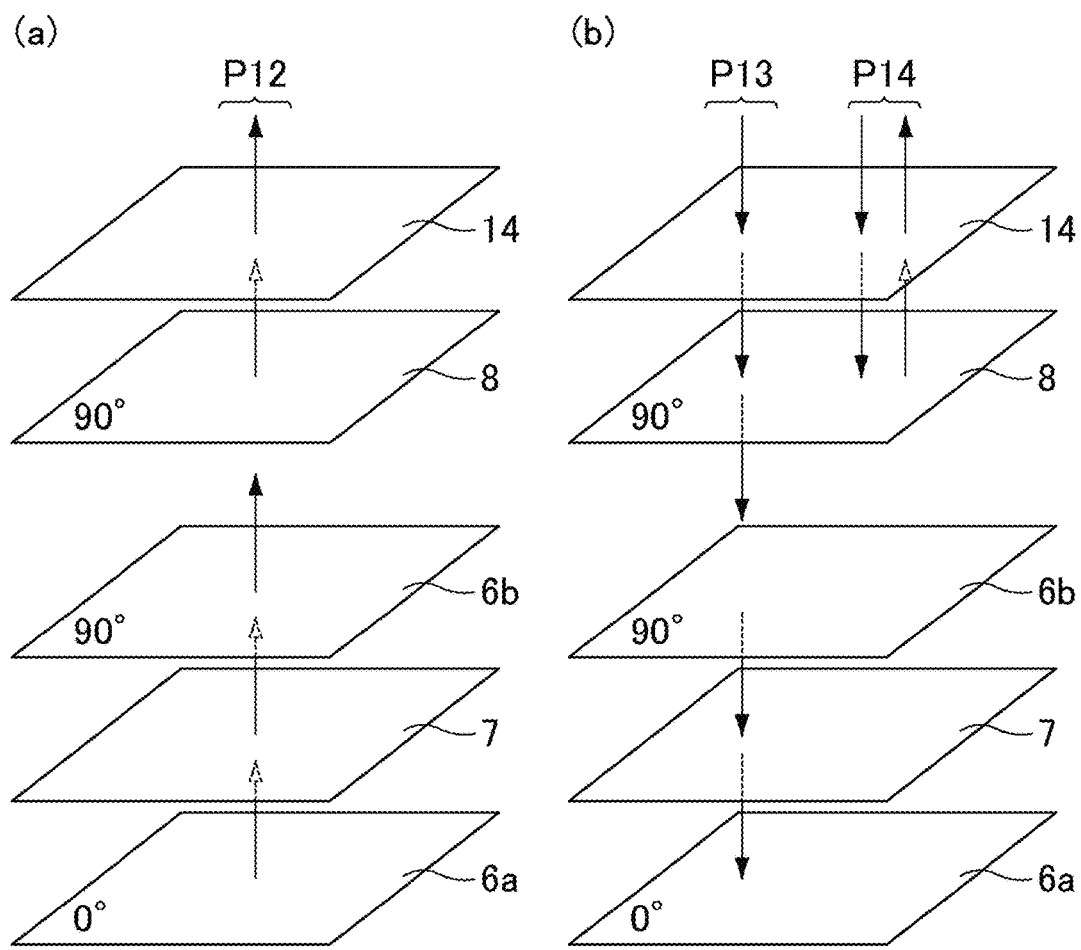
FIG. 16 includes explanatory views showing the operation principle of the mirror display of Example 9 in a display mode.
Figure 17:
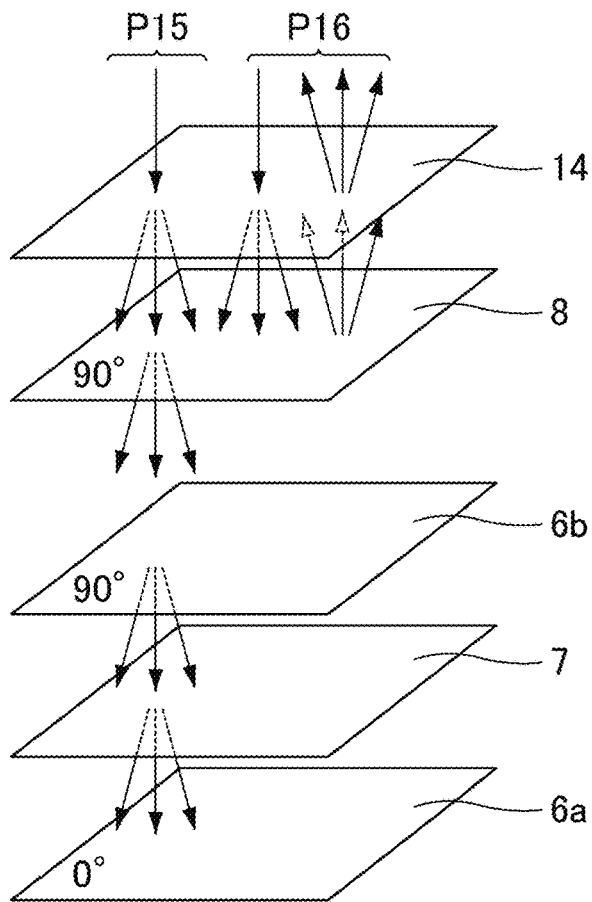
FIG. 17 is an explanatory view showing the operation principle of the mirror display of Example 9 in a mirror mode.

A mirror display of Example 9 can be operated in both the display mode and the mirror mode on the basis of the following principle. The operation principle is described with reference to FIG. 16 and FIG. 17. FIG. 16 includes explanatory views showing the operation principle of the mirror display of Example 9 in a display mode. FIG. 17 is an explanatory view showing the operation principle of the mirror display of Example 9 in a mirror mode. In FIG. 16 and FIG. 17, part of the mirror display shown in FIG. 15 is taken out, and the members are shown apart from one another for convenience. The arrows in FIG. 16 and FIG. 17 indicate paths of light passing through each member.

In the display mode, as shown by paths P12 of light in FIG. 16(a), the light emitted from the liquid crystal display device 2 is the first polarized light. Since the transmission axis of the reflective polarizer 8 is at an azimuth angle of 90°, the first polarized light can pass through the reflective polarizer 8 with hardly any loss. The polymer-dispersed liquid crystal display panel 14 is in a voltage-applied state in the display mode, that is, in a transparent state (transmission state). As a result, the first polarized light transmitted through the reflective polarizer 8 can pass through the polymer-dispersed liquid crystal display panel 14. Thus, the mirror display of Example 9 can show an image with a high luminance in spite of including the half mirror plate 4j. Additionally, the mirror display of Example 9 is free from the possibility of troubles such as a decrease in luminance or blurring of images in the display mode, as in the mirror displays of Examples 3 to 5.

Next, the following describes the behavior of light incident on the half mirror plate 4j from the viewing surface side in the display mode. In the display mode, as shown by paths P13 of light in FIG. 16(b), the first polarized light component among the light components incident on the half mirror plate 4j from the viewing surface side passes through the polymer-dispersed liquid crystal display panel 14 and then can pass through the reflective polarizer 8 with hardly any loss. The first polarized light transmitted through the reflective polarizer 8 then passes through the absorptive polarizer 6b and the liquid crystal display panel 7 in the mentioned order, and is absorbed by the absorptive polarizer 6a in the end.

Meanwhile, as shown by paths P14 of light in FIG. 16(b), the second polarized light component among the light components incident on the half mirror plate 4j from the viewing surface side passes through the polymer-dispersed liquid crystal display panel 14 and is reflected by the reflective polarizer 8 whose transmission axis is at an azimuth angle of 90°, i.e., whose reflection axis is at an azimuth angle of 0°. The second polarized light component reflected by the reflective polarizer 8 then passes through the polymer-dispersed liquid crystal display panel 14 and is emitted to the viewing surface side.

As mentioned above, the mirror display of Example 9 is free from diffuse reflection of outside light in the display mode, thereby showing better visibility than the mirror displays of Examples 3 to 5.

In the mirror mode, as shown by paths P15 of light in FIG. 17, the first polarized light component among the light components incident on the half mirror plate 4j from the viewing surface side is incident on the polymer-dispersed liquid crystal display panel 14 at first. The polymer-dispersed liquid crystal display panel 14 is in a no-voltage-applied state in the mirror mode and thus in a non-transparent state (scattering state). As a result, the first polarized light incident on the polymer-dispersed liquid crystal display panel 14 is diffused by the polymer-dispersed liquid crystal display panel 14. Subsequently, the light diffused by the polymer-dispersed liquid crystal display panel 14 passes through the reflective polarizer 8. The light transmitted through the reflective polarizer 8 then passes through the absorptive polarizer 6b and the liquid crystal display panel 7 in the mentioned order, and is absorbed by the absorptive polarizer 6a in the end.

Meanwhile, as shown by paths P16 of light in FIG. 17, the second polarized light component among the light components incident on the half mirror plate 4j from the viewing surface side is scattered by the polymer-dispersed liquid crystal display panel 14. Subsequently, almost all of the light components scattered by the polymer-dispersed liquid crystal display panel 14 is reflected by the reflective polarizer 8. The light reflected by the reflective polarizer 8 is then diffused by the polymer-dispersed liquid crystal display panel 14 and then emitted to the viewing surface side.

In this manner, the mirror display of Example 9 can serve as a mirror. Additionally, the mirror display of Example 9, having a diffusely reflecting surface in the mirror mode, can match the peripheral environment having diffusely reflecting surfaces.

COMPARATIVE EXAMPLE 1

Comparative Example 1 relates to a conventional mirror display that includes a liquid crystal display device and a reflective polarizer as a half mirror layer. The difference from Example 1 is that the mirror display includes no light-diffusing member. The mirror display of Comparative Example 1 is the same as the mirror display of Example 1 except for the above configuration, so that the explanation of the same respects is omitted here.

Figure 18:
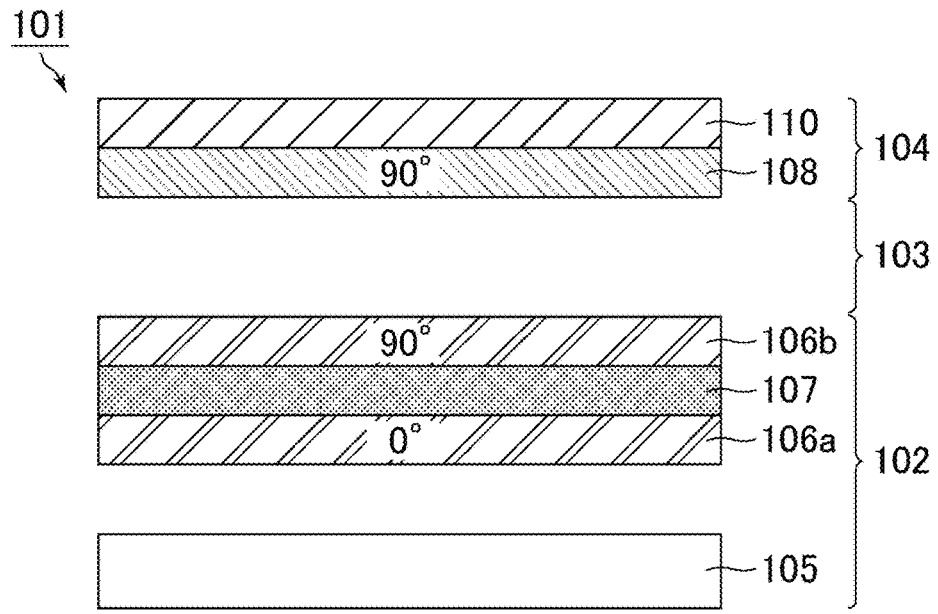
FIG. 18 is a schematic cross-sectional view showing a mirror display of Comparative Example 1.

FIG. 18 is a schematic cross-sectional view showing a mirror display of Comparative Example 1. As shown in FIG. 18, a mirror display 101 includes, in the order from the back surface side toward the viewing surface side, a liquid crystal display device 102, an air layer 103, and a half mirror plate 104. The liquid crystal display device 102 and the half mirror plate 104 were fixed by fitting the upper and lower edges of the half mirror plate 104 to a pair of aluminum rails which are attached to the upper and lower edges of the liquid crystal display device 102 so as to form a frame-like structure. The air layer 103 is the space formed in a slight gap between the liquid crystal display device 102 and the half mirror plate 104.

The liquid crystal display device 102 includes, in the order from the back surface side toward the viewing surface side, a backlight 105, an absorptive polarizer 106a, a liquid crystal display panel 107, and an absorptive polarizer 106b. The liquid crystal display device 102 used was a liquid crystal television (trade name: LC-20F5) available from Sharp Corp. The display mode of the liquid crystal display panel 107 was UV$^2$A.

The absorptive polarizer 106a was bonded to the back surface side of the liquid crystal display panel 107 with an acrylic adhesive (not shown) in between. The absorptive polarizer 106b was bonded to the viewing surface side of the liquid crystal display panel 107 with an acrylic adhesive (not shown) in between. The transmission axis of the absorptive polarizer 106a was set to an azimuth angle of 0° and the transmission axis of the absorptive polarizer 106b was set to an azimuth angle of 90°, thereby the two transmission axes being arranged in crossed Nicols, provided that the degree of azimuth angle is defined to increase in positive (+) in the counterclockwise direction starting from the long side of the liquid crystal display device 102. The absorptive polarizer 106b underwent no anti-reflection treatment but underwent an AG treatment with a haze of 3.0% on the surface thereof.

The half mirror plate 104 includes, in the order from the back surface side toward the viewing surface side, a reflective polarizer 108 as a half mirror layer and a glass substrate 110 as a base material supporting the half mirror layer. The respective members were bonded to each other with an acrylic adhesive (not shown) in between. The thickness of the glass substrate 110 was set to 2.5 mm. For the reflective polarizer 108, a multi-layer reflective polarizer (trade name: DBEF) available from Sumitomo 3M Ltd. was used with the azimuth angle of the transmission axis thereof set to 90°.

Figure 19:
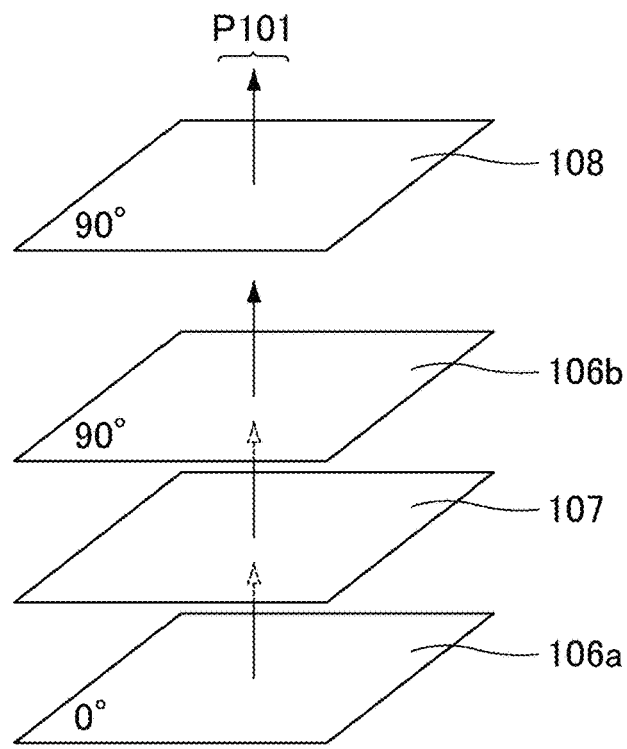
FIG. 19 is an explanatory view showing the operation principle of the mirror display of Comparative Example 1 in a display mode.
Figure 20:
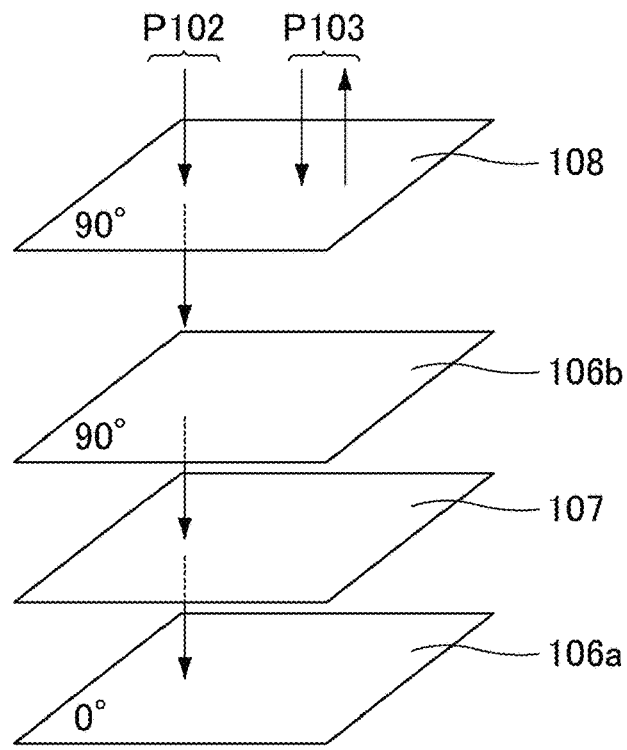
FIG. 20 is an explanatory view showing the operation principle of the mirror display of Comparative Example 1 in a mirror mode.

The mirror display of Comparative Example 1 can be operated in both the display mode and the mirror mode on the basis of the following principle. The operation principle is described with reference to FIG. 19 and FIG. 20. FIG. 19 is an explanatory view showing the operation principle of the mirror display of Comparative Example 1 in a display mode. FIG. 20 is an explanatory view showing the operation principle of the mirror display of Comparative Example 1 in a mirror mode. In FIG. 19 and FIG. 20, part of the mirror display shown in FIG. 18 is taken out and the members are shown apart from one another for convenience. The arrows in FIG. 19 and FIG. 20 indicate paths of light passing through each member.

In the display mode, the liquid crystal display panel 107 shows an image and a viewer observes the image on the liquid crystal display panel 107 through the half mirror plate 104. As shown by paths P101 of light in FIG. 19, the light emitted from the liquid crystal display device 102 is the first polarized light. Since the transmission axis of the reflective polarizer 108 is at an azimuth angle of 90°, the first polarized light can pass through the reflective polarizer 108 with hardly any loss. Thus, the mirror display of Comparative Example 1 can show an image with a high luminance as in a conventional liquid crystal display device in spite of including the half mirror plate 104.

In the mirror mode, the liquid crystal display panel 107 shows no image and a viewer observes only the outside light reflected by the half mirror plate 104. As shown by paths P102 of light in FIG. 20, the first polarized light component among the light components incident on the half mirror plate 104 from the viewing surface side passes through the reflective polarizer 108. The light transmitted through the reflective polarizer 108 then passes through the absorptive polarizer 106b and the liquid crystal display panel 107 in the mentioned order, and is absorbed by the absorptive polarizer 106a in the end.

In contrast, as shown by paths P103 of light in FIG. 20, the second polarized light component among the light components incident on the half mirror plate 104 from the viewing surface side is mostly reflected by the reflective polarizer 108 with the azimuth angle of the transmission axis thereof set to 90°, that is, with the azimuth angle of the reflection axis thereof set to 0°.

In this manner, the mirror display of Comparative Example 1 can serve as a mirror. Unfortunately, the mirror display of Comparative Example 1, having an almost perfect specular reflective surface as in a usual mirror, is less likely to match the peripheral environment having diffusely reflecting surfaces, leaving uncomfortable feeling.

[Evaluation Results of Mirror Displays]

For the mirror displays of Examples 1 to 5 and Comparative Example 1, (1) the transmittance in the display mode, (2) the image sharpness in the display mode, and (3) the diffuse reflectance in the mirror mode are summarized in Table 1.

The transmittance in the display mode was determined by measuring the screen luminance of white display of a liquid crystal display device in a darkroom, and standardizing the measured value based on the white-screen luminance (defined as 100%) of a liquid crystal display device (trade name: LC-20F5, available from Sharp Corp.) commonly used in the examples. The measurement device used was a spectroradiometer (trade name: SR-UL1) available from Topcon Corp. The Y value after visibility correction was taken as the luminance.

The image sharpness in the display mode was determined by the following method. A stripe pattern consisting of white and black thin lines was shown on the screen of the liquid crystal display device, and the screen was photographed. The contrast ratio between the bright part and the dark part was calculated by image processing, and the image sharpness was determined based on the equation: image sharpness (%)=[{(brightness in the bright part)−(brightness in the dark part)}/{(brightness in the bright part)+(brightness in the dark part)}]×100. The spatial frequency of the stripe pattern on the surface of the liquid crystal display device was 0.6 LP/mm, wherein LP is one line pair consisting of one white thin line and one black thin line. The brightness in each of the bright part and the dark part was calculated by transforming the image file photographed with a digital camera into an 8-bit (256 gray scale values from 0 to 255) gray-scale image file with open source type image-editing software called Image-J, and performing gamma correction of $(n/255)^{2.2}$ to the emitted gray scale value n.

The diffuse reflectance in the mirror mode refers to a reflectance when the liquid crystal display device shows black display (power-off state). The measuring instrument used was a benchtop spectrophotometer (trade name: CM-2600d, measurement wavelength range: 360 nm to 740 nm, integrating sphere system) available from Konica Minolta, Inc. The reflection measurement mode was Specular Component Excluded (SCE) mode. In the SCE mode, both diffusely reflected light and specularly reflected light are measured and the reflectance excluding the specularly reflected light is measured. The diffuse reflectivity highly relates to whitishness by subjective evaluation.

TABLE 1

| | Transmittance (%) in display mode | Image sharpness (%) in display mode | Diffuse reflectance (%) in mirror mode |
| --- | --- | --- | --- |
| Comparative Example 1 | 92 | 95 | 0 |
| Example 1 | 79 | 92 | 16 |
| Example 2 | 76 | 77 | 30 |
| Example 3 | 81 | 95 | 27 |
| Example 4 | 79 | 94 | 34 |
| Example 5 | 76 | 93 | 40 |

As a result of subjective evaluation, each of the mirror displays of Examples 1 to 5 was evaluated to have diffuse reflectivity in the mirror mode and match the white wall and the interior in the evaluation room. Additionally, each of the mirror displays of Examples 1 to 5 was evaluated to achieve bright and sharp display in the display mode. In particular, no blurring of images was observed at all in the display mode in the mirror displays of Examples 3 to 5 and the display performance thereof was very good.

In contrast, in the evaluation for the mirror display of Comparative Example 1, while admitting bright and sharp display in the display mode, the observer felt the mirror display obstructive because the display looked too conspicuous and had reflections of the observer himself/herself or of the lighting or objects placed in front of the mirror display in the mirror mode. This is because the mirror display of Comparative Example 1, including no light-diffusing member, had an almost perfect specular reflective surface in the mirror mode.

As a result of the similar subjective evaluation for the mirror displays of Examples 6 to 9, the mirror displays of Examples 6 to 9 were evaluated to have better visibility than the mirror displays of Examples 3 to 5. This is because the mirror displays of Examples 6 to 9 were free from diffuse reflection of outside light in the display mode.

EXAMPLE 10

Example 10 relates to an electronic device including the mirror display of Example 1 and a display light control device.

Figure 21:
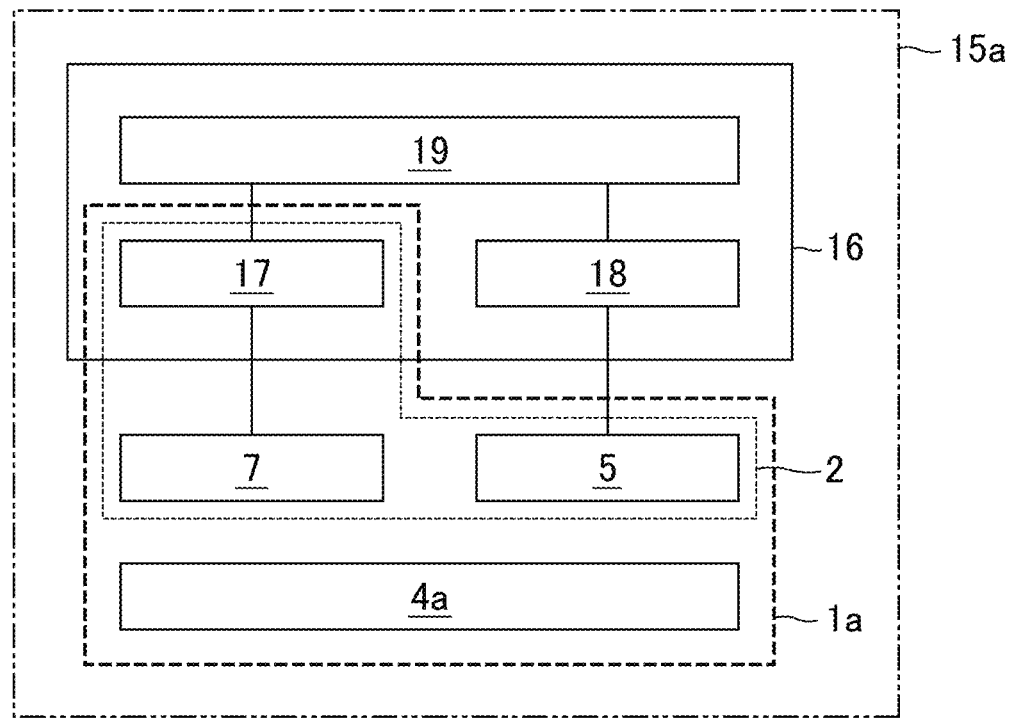
FIG. 21 is a block diagram for explaining the main structure of an electronic device of Example 10.

FIG. 21 is a block diagram for explaining the main structure of an electronic device of Example 10. As shown in FIG. 21, an electronic device 15a includes a mirror display 1a and a display light control device 16. The mirror display 1a includes the liquid crystal display device 2 and the half mirror plate 4a, and the liquid crystal display device 2 includes the liquid crystal display panel 7 and the backlight 5 therein. The display light control device 16 includes a panel control unit 17, a backlight control unit 18, and a signal control unit 19.

The panel control unit 17 includes a controller and a driver each configured to drive the liquid crystal display panel 7. For the physical structure thereof, the panel control unit 17 may or may not be built in the liquid crystal display device 2. In Example 10, the panel control unit 17 is built in a liquid crystal television (trade name: LC-20F5, available from Sharp Corp.) used as the liquid crystal display device 2.

The backlight control unit 18 includes a controller and a driver each configured to drive the backlight 5, and may or may not be built in the liquid crystal display device 2. The backlight control unit 18 emits signals for switching the display mode and the mirror mode. The backlight control unit 18 also provides an effect of turning off the backlight 5 in response to the presence or absence of image signals.

The signal control unit 19 emits signals for operating the panel control unit 17 and the backlight control unit 18 together.

When a user selects the mirror mode, the display light control device 16 transmits a control signal for stopping the driving of the liquid crystal display panel 7 to the panel control unit 17 and transmits a control signal for turning off the backlight 5 to the backlight control unit 18. This prevents unnecessary light leakage on the back surface side of the mirror surface in the mirror mode, so that the mirror performance in the mirror mode can be maximized and the electric energy consumption of the liquid crystal display device 2 can be suppressed. The signal control unit 19 can be configured to transmit a control signal for turning off the backlight 5 to the backlight control unit 18 when the image signal is zero, i.e., the liquid crystal display device 2 shows a black screen.

Example 10 employed the configuration in which the electronic device was provided with the mirror display of Example 1. Alternatively, any one of the mirror displays of Examples 2 to 9 may be provided in place of the mirror display of Example 1.

EXAMPLE 11

Example 11 relates to an electronic device including a mirror display and a display light control device. The difference from Example 10 is that a local-dimming backlight is used as the backlight of the liquid crystal display device. The electronic device of Example 11 is the same as the electronic device of Example 10 except for the above configuration, so that the explanation of the same respects is omitted here.

Figure 22:
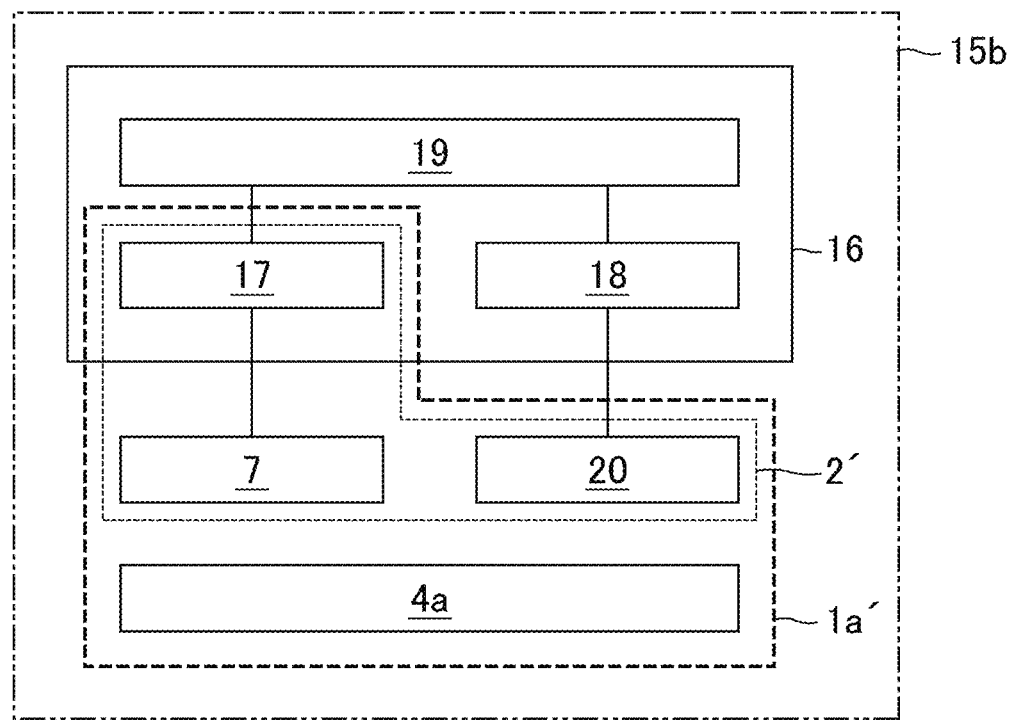
FIG. 22 is a block diagram for explaining the main structure of an electronic device of Example 11.
Figure 23:
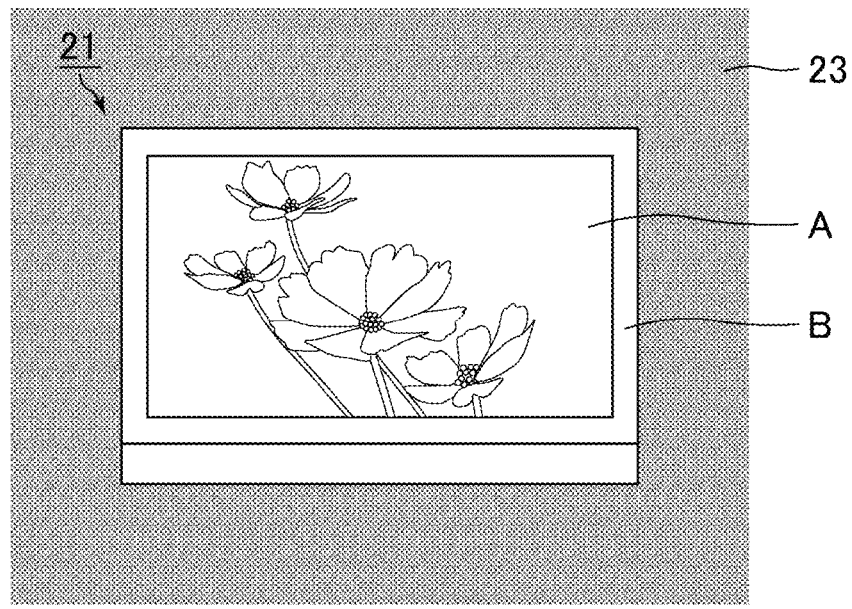
FIG. 23 includes explanatory views showing the display states in the power-on state and in the power-off state of a common conventional display device.
Figure 23:
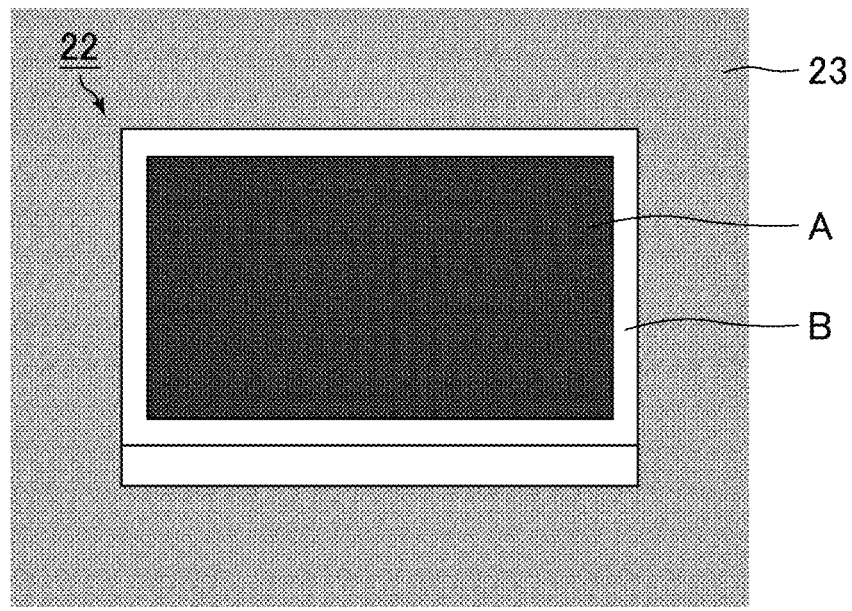

FIG. 22 is a block diagram for explaining the main structure of an electronic device of Example 11. As shown in FIG. 22, an electronic device 15b includes a mirror display 1a' and the display light control device 16. The mirror display 1a' includes a liquid crystal display device 2' and the half mirror plate 4a, and the liquid crystal display device 2' includes the liquid crystal display panel 7 and a local-dimming backlight 20 therein. The display light control device 16 includes the panel control unit 17, the backlight control unit 18, and the signal control unit 19.

The local-dimming backlight is a backlight unit which has a light-emitting region divided into multiple blocks (domains) and has a function of controlling the luminances of the respective blocks of the backlight or turning off the backlight of target blocks in response to an input image. In Example 11, light emitting diode (LED) light sources were arranged in blocks of 16 rows×9 columns, and the luminances of the backlight can be controlled per block in response to the control signals from the LED controller.

Since the local-dimming backlight 20 can control the luminances of the backlight per block (in other words, locally), it can provide not only a function of switching the display mode and the mirror mode on the whole screen in terms of time but also a function of driving one domain in the mirror mode and another domain in the display mode at the same time on the same screen. For example, the center of the display region may be a mirror region. In the domain driven in the mirror mode, the backlight is locally turned off or the luminance thereof is reduced.

The electronic device 15b may further include an input device such as a touch panel. In this case, for example, the device may have a function of changing the sizes of the display region and the mirror region in response to pinch-in and pinch-out gestures on the touch panel. When a user performs a pinch-in gesture on a display (touch panel), the size of the display region is reduced and the size of the peripheral region, i.e., the mirror region, is expanded in response to the gesture. In contrast, when a user performs a pinch-out gesture on a display (touch panel), the size of the display region is expanded and the size of the peripheral region, i.e., the mirror region, is reduced in response to the gesture. Such operating feeling can improve the convenience of electronic devices and the commercial value thereof. This function can also be achieved in the electronic device 15a of Example 10, which includes no local-dimming backlight 20, by showing a black screen in a region desired to serve as the mirror region. Still, if light leakage from the liquid crystal display device 2 deteriorates the mirror performance of the mirror region, a user may feel uncomfortable. Thus, the above function is particularly suitable for embodiments using the local-dimming backlight 20, as shown in Example 11.

Example 11 employed the electronic device with the mirror display of Example 1 in which the backlight is replaced by a local-dimming backlight. Alternatively, an electronic device with any one of the mirror displays of Examples 2 to 9 may be employed in which the backlight is replaced by a local-dimming backlight.

OTHER PREFERRED EXAMPLES

In each of the mirror displays of Examples 1 to 9, a pattern-printed transparent sheet may be stacked on the viewing surface of the mirror display so that the display can match the peripheral environment having various patterns. For example, the texture of a wall paper or wood can be reproduced. When a pattern is printed on a transparent sheet, the pattern may be printed with a normal ink. From the view point that the ink does not affect the polarized light emitted from the liquid crystal display device, the pattern is preferably printed with a dichroic absorptive ink or a dichroic fluorescent ink. Instead of the pattern-printed transparent sheet, a surface-treated transparent sheet on which a pattern is made by changing the haze or reflectance may be used. Alternatively, the pattern may be printed with a photochromic ink capable of controlling coloring with a light stimulus or a thermochromic ink capable of controlling coloring with a thermal stimulus.

(Additional Remarks)

The following will describe examples of preferred embodiments of the mirror display according to the present invention. The respective examples may appropriately be combined with each other within the spirit of the present invention.

The display device may include a polarizer and the transmission axis of the polarizer and the transmission axis of the reflective polarizer may be substantially parallel or perpendicular to each other. This enables suitable use of the present invention even when display light emitted from the display device is polarized light. Configurations with such relations between the transmission axis of the polarizer and the transmission axis of the reflective polarizer are shown as follows.

In the case where the display device includes one polarizer (e.g. an anti-reflection circular polarizer provided on an organic electroluminescence display device) or multiple polarizers whose transmission axes are parallel to each other (e.g. a pair of polarizers disposed in parallel Nicols and provided on a liquid crystal display device) and the reflective polarizer includes a multi-layer reflective polarizer, the mirror display is preferably configured such that the transmission axis of the reflective polarizer is substantially parallel to the transmission axis of the polarizer(s) of the display device. Meanwhile, in a liquid crystal display device including a pair of polarizers disposed in crossed Nicols, in the case where the polarizer closer to the half mirror plate (usually on the viewing surface side) is eliminated and the function thereof is alternatively achieved by the multi-layer reflective polarizer of the half mirror plate, the polarizer of the liquid crystal display device farther from the half mirror plate (usually on the back surface side) and the multi-layer reflective polarizer are disposed in crossed Nicols. Accordingly, the mirror display is preferably configured such that the reflective polarizer is substantially perpendicular to the transmission axis of the polarizer of the liquid crystal display device.

Also, in the case where the display device includes a pair of polarizers whose transmission axes are perpendicular to each other (e.g. a pair of polarizers disposed in crossed Nicols and provided on the liquid crystal display device) and the reflective polarizer includes a multi-layer reflective polarizer, the mirror display is preferably configured such that the transmission axis of the polarizer closer to the half mirror plate (usually on the viewing surface side) is substantially parallel to the transmission axis of reflective polarizer. In this configuration, the transmission axis of the polarizer farther from the half mirror plate (usually on the back surface side) is substantially perpendicular to the transmission axis of the reflective polarizer.

Also, the effects of the present invention can work even when the display light emitted from the display device is not polarized light, (e.g., when an organic electroluminescence display device without a polarizer is used).

The light-diffusing member may include at least one light-diffusing layer with a haze not affected by polarization state of incident light. This enables effective use of the light-diffusing member utilizing the at least one light-diffusing layer.

The at least one light-diffusing layer may have a haze of 20% or higher. This enables sufficient diffuse reflectivity of the mirror display in the mirror mode. If the at least one light-diffusing layer is a stack of multiple light-diffusing layers, the haze of the stacked layers as a whole is preferably 20% or higher.

The light-diffusing member may include a polarized-light-diffusing layer with a haze affected by polarization state of incident light, and the transmission axis of the reflective polarizer and the transmission axis of the polarized-light-diffusing layer may be substantially parallel to each other. This enables effective use of the light-diffusing member utilizing the effect that the polarized-light-diffusing layer diffuses polarized light vibrating along the diffusion axis. Moreover, a decrease in luminance and blurring of images in the display mode can be suppressed by arranging the transmission axis of the reflective polarizer substantially parallel to the transmission axis of the polarized-light-diffusing layer.

The half mirror plate may further include a switching region, and the switching region may be disposed closer to the viewing surface side than the polarized-light-diffusing layer and may be capable of switching the state that light can pass through from the viewing surface side of the mirror display to the display device and the state that light cannot pass through from the viewing surface side of the mirror display to the display device. This allows the half mirror plate to switch the display mode and the mirror mode also in the case of using the switching region, and thus enables suitable use of the present invention.

The switching region may include, in the order from the back surface side, a liquid crystal display panel and an absorptive polarizer, and the transmission axis of the absorptive polarizer and the transmission axis of the reflective polarizer may be substantially parallel or perpendicular to each other. This causes that a half of the light components incident on the mirror display from outside is absorbed by the absorptive polarizer and the other half thereof passes through the absorptive polarizer. In the mirror mode, the light transmitted through the absorptive polarizer is diffused by the light-diffusing member, and then is reflected by the reflective polarizer to contribute to the function as a mirror. In the display mode, the light transmitted through the absorptive polarizer passes through the light-diffusing member and the reflective polarizer in the mentioned order and is absorbed inside the display device. Accordingly, the mirror display is free from diffuse reflection of outside light in the display mode to sufficiently suppress reflections, and thus can display an image with good visibility.

The polarized-light-diffusing layer may have a haze in the azimuthal orientation of the diffusion axis of 20% or higher. This enables sufficient diffuse reflectivity of the mirror display in the mirror mode.

The light-diffusing member may include a polymer-dispersed liquid crystal display panel. This enables: effective use of the light-diffusing member utilizing the effect in which the polymer-dispersed liquid crystal display panel controls scattering and transmission of incident light in response to the voltage-applied state and no-voltage-applied state; suppression of a decrease in luminance and blurring of images in the display mode; and sufficient suppression of reflections and a displayed image with good visibility without diffuse reflection of outside light in the display mode.

The display device may be a liquid crystal display device. This enables: suitable use of the present invention also in the case where a liquid crystal display device is used as the display device; and achievement in both the visibility of a displayed image in the display mode and the visibility of a reflected image in the mirror mode by a combination use with the reflective polarizer. Examples of the display device that emits polarized light like a liquid crystal display device include an organic electroluminescence display device provided with an anti-reflection circular polarizer. Alternatively, the display device may be a 3D display which can give stereoscopic (3D) images. The 3D display can provide natural depth perception in the display region as well as in the mirror region, improving the design quality of the mirror display. Thus, the mirror display can be utilized in various uses. The mode of displaying stereoscopic images of the 3D display may be of any mode, and it is more preferably autostereoscopy requiring no special glasses. Examples of the autostereoscopy for 3D displays include a lenticular lens technique and a parallax barrier technique.

The following will describe examples of preferred embodiments of the electronic device according to the present invention. The respective examples may appropriately be combined with each other within the spirit of the present invention.

The electronic device may have not only a function of switching the display mode and the mirror mode on the whole screen in terms of time but also a function of driving a certain domain in the mirror mode and another domain in the display mode at the same time on the same screen. For example, in the display device, the center portion of the display region may show a black screen and the peripheral portion thereof shows an image, so that the mirror region may be formed only at the center portion of the display region. In other words, the electronic device may further include a control device that controls the display region by dividing the display region into multiple domains and the control device may be configured to change the range and position of displaying an image by selecting a domain to display an image among the multiple domains. Since the range and position of displaying an image can be changed, various uses combining the mirror function and the image-displaying function of the display device can be provided.

In a domain driven in the mirror mode in the electronic device, the backlight of the electronic device may locally be turned off, or the luminance of the backlight may be reduced. This can suppress light leakage from the liquid crystal display device. In these cases, a local-dimming backlight may be used.

The range of displaying an image may be changeable in response to pinch-in and pinch-out gestures. This can achieve a convenient electronic device.

REFERENCE SIGNS LIST 1a, 1a', 1b, 1c, 1d, 1e, 1f, 1g, 1h, 1j, 101: mirror display
2, 2', 102: liquid crystal display device
3, 103: air layer
4a, 4b, 4c, 4d, 4e, 4f, 4g, 4h, 4j, 104: half mirror plate
5, 105: backlight
6a, 6b, 6c, 106a, 106b: absorptive polarizer
7, 107: liquid crystal display panel
8, 108: reflective polarizer
9: light-diffusing layer
10, 110: glass substrate
11a, 11b, 11c: polarized-light-diffusing layer
12: switching region
13: switching liquid crystal display panel
14: polymer-dispersed liquid crystal display panel
15a, 15b: electronic device
16: display light control device
17: panel control unit
18: backlight control unit
19: signal control unit
20: local-dimming backlight
21: display device in the power-on state
22: display device in the power-off state
23: wall
P1, P2, P3, P4, P5, P6, P7, P8, P9, P10, P11, P12, P13, P14, P15, P16, P101, P102, P103: paths of light
A: display region
B: frame region

The invention claimed is:

1. A mirror display comprising:
a half mirror plate that includes a reflective polarizer; and
a display device, wherein
the half mirror plate further includes a light-diffusing member that diffuses at least a portion of incident light,
the light-diffusing member includes a polarized-light-diffusing layer with a haze affected by a polarization state of incident light,
the polarized-light-diffusing layer has a haze in an azimuthal orientation of a transmission axis,
the haze in the azimuthal orientation of the transmission axis of the polarized-light-diffusing layer is less than a haze in an azimuthal orientation of a diffusion axis of the polarized-light-diffusing layer,
a transmission axis of the reflective polarizer and the transmission axis of the polarized-light-diffusing layer are parallel or substantially parallel to each other, and
the mirror display includes, in an order from a back surface side, the display device, the reflective polarizer, and the light-diffusing member.

2. The mirror display according to claim 1, wherein
the display device includes a polarizer, and
a transmission axis of the polarizer and the transmission axis of the reflective polarizer are substantially parallel or perpendicular to each other.

3. The mirror display according to claim 1, wherein
the half mirror plate further includes a switching region, and
the switching region is closer to a viewing surface side than the polarized-light-diffusing layer and is capable of switching a state that light can pass through from the viewing surface side of the mirror display to the display device and a state that light cannot pass through from the viewing surface side of the mirror display to the display device.

4. The mirror display according to claim 3, wherein
the switching region includes, in the order from the back surface side, a liquid crystal display panel and an absorptive polarizer, and
a transmission axis of the absorptive polarizer and the transmission axis of the reflective polarizer are substantially parallel or perpendicular to each other.

5. The mirror display according to claim 1, wherein the polarized-light-diffusing layer has the haze in the azimuthal orientation of the diffusion axis of 20% or greater.

6. The mirror display according to claim 1, wherein the light-diffusing member includes a polymer-dispersed liquid crystal display panel.

7. The mirror display according to claim 1, wherein the display device is a liquid crystal display device.

8. An electronic device comprising the mirror display according to claim 1.

9. The mirror display according to claim 1, wherein the polarized-light-diffusing layer has the haze in the azimuthal orientation of the transmission axis of 13.2% or greater.

* * * * *